United States Patent [19]

Matsuoka

[11] Patent Number: 4,932,763

[45] Date of Patent: Jun. 12, 1990

[54] ASPHERICAL SINGLE LENS SYSTEM FOR USE WITH OPTICAL CARDS

[75] Inventor: Kazuhiko Matsuoka, Yokohama, Japan

[73] Assignee: Canon Kabushiki Kaisha, Tokyo, Japan

[21] Appl. No.: 385,374

[22] Filed: Jul. 27, 1989

[30] Foreign Application Priority Data

Jul. 28, 1988 [JP] Japan .................................. 63-189711
Jul. 28, 1988 [JP] Japan .................................. 63-189712

[51] Int. Cl.$^5$ .............................................. G02B 13/18
[52] U.S. Cl. ................................................... 350/432
[58] Field of Search ................................... 350/432–435

[56] References Cited

U.S. PATENT DOCUMENTS

| | | | |
|---|---|---|---|
| 4,027,952 | 6/1977 | Huguas | 350/432 |
| 4,449,792 | 5/1984 | Arai et al. | 350/432 |
| 4,571,034 | 2/1986 | Nakamura | 350/432 |
| 4,641,929 | 2/1987 | Braat | 350/432 |
| 4,671,623 | 6/1987 | Chikuma | 350/432 |
| 4,743,093 | 5/1988 | Oinen | 350/432 |
| 4,765,723 | 8/1988 | Takamura | 350/432 |
| 4,768,867 | 9/1988 | Suda | 350/432 |
| 4,842,388 | 6/1989 | Tanaka et al. | 350/432 |

*Primary Examiner*—Scott J. Sugarman
*Attorney, Agent, or Firm*—Fitzpatrick, Cella, Harper & Scinto

[57] ABSTRACT

An aspherical single lens which has first and second surfaces both comprising aspherical surfaces represented by the following equation, and which meets the following conditions (1), (2) and (3), wherein a distance from any arbitrary point on either aspherical surface to a plane tangential to an apex of the aspherical surface is X, a distance from the arbitrary point to the optical axis is H, the radius of reference curvature of the $\nu$-th surface (i.e., the radius of curvature of the apex) is $R\nu$, a conical constant of the $\nu$-th surface is $K\nu$, and the aspherical coefficient of the $\nu$-th surface is $A\nu_i$ (i=3, 4, ...):

$$X = \frac{H^2/R\nu}{1 + \sqrt{1 - (1 + K\nu)(H/R\nu)^2}} + A\nu_3 H^3 + A\nu_4 H^4 + \ldots$$

$$(\nu = 1, 2)$$

(1) $\quad 0.68 < \dfrac{(N-1)F^3}{N^2 R_1^3} < 0.73$ (2) $\quad 0.27 < \dfrac{(N-1)D}{NR_1} < 0.51$ (3) $\quad -0.40 < \dfrac{R_1}{R_2} < -0.26$ where F is the focal length of the aspherical single lens, D is a thickness of the aspherical single lens along the optical axis, and N is an index of refraction of the aspherical single lens for the particular wavelength of light used with said lens. The present aspherical single lens can satisfactorily correct aberration in both on-axis and off-axis regions through a parallelepiped plate having a thickness of about 0.04 F–0.111 F. An optical head of optical information recording reproducers such as optical card recording reproducers can be reduced in weight and size by utilizing the aspherical single lens of the present invention as an objective or as a collimating lens.

3 Claims, 10 Drawing Sheets

ASPHERICAL SINGLE LENS SYSTEM FOR USE WITH OPTICAL CARDS

BACKGROUND OF THE INVENTION

Field of the Invention and Related Art

The present invention relates to a single lens having an aspherical surface and, more particularly, to a single lens which is aspherical on both surfaces and has a value of NA (Numerical Aperture) that is on the order of 0.42–0.50.

Recently, optical disks such as video disks or compact disks have been widely employed as information recording carriers (or media) with large storage capacity in the form of optical memories.

The optical card, an optical information recording carrier like an optical disk, has also received widespread attention due to advantages of large storage capacity and handy transportability.

In order both to record information in those recording carriers with high density and/or reproduce the recorded information therefrom with high accuracy, objectives (or object lenses) for use in information recording reproducers are required to have an optical resolution of about several $\mu$m. This in turn necessitates an objective with an NA above 0.4.

When objectives are used in such applications, it is further necessary to maintain a sufficient distance between the surface of a recording carrier, such as an optical disk or an optical card, and the objective, thereby to prevent contact therebetween and to avoid damage to the recording carrier and the objective.

Moreover, most of the information recording reproducers have been designed to move objectives along the optical axis or in a direction perpendicular to the optical axis as part of a servo control of auto-focusing or auto-tracking. Therefore, the objectives used to this end are required to be smaller in both size and weight for the improved responsivity.

In the past, Japanese Patent Laid-Open App. No. 58-24021 (U.S. Pat. No. 4,484,802), App. No. 58-208719, and App. No. 60-122915, for example, have disclosed objectives of the above-discussed type wherein a lens system compris four groups of four lenses.

However, the objectives as disclosed in the above published applications have a large overall length of the lens system and cannot achieve a decrease in both size and weight.

To overcome the above-mentioned drawbacks, development of aspherical single lenses has been made intensively and extensively. Relevant techniques are disclosed in the former publications of U.S. Pat. Nos. 4,027,952, 4,449,792, 4,571,034, 4,743,093, as well as in Japanese Patent Laid-Open App. No. 57-201210, App. No. 58-68711, App. No. 59-23313, App. No. 61-11715, and App. No. 61-56314, for example.

The aspherical single lenses as disclosed in such further publications are designed to be suited for the specifications of optical disks, but are quite unsuitable for use in recording carriers such as optical cards. Optical cards have protective layers coated on the information recording surfaces that are thinner than those on the optical disks.

Since optical cards typically have a thickness on the order of 0.8 mm, which is almost the same as that of commonly used magnetic cards, a transparent protective layer of the optical card should have a thickness t of about 0.4 mm, taking into account structural strength and other factors of the optical card.

In accordance with the embodiments of aspherical single lenses as disclosed in the above further publications where the focal length of the lens is F, the thickness t of a transparent protective layer of the recording carrier then is state to be on the order of 0.26 F–0.28 F, for those lenses exemplified in the embodiments that would be adapted to optical cards. Accordingly, the focal length F of the objective should become 1.43–1.54 mm, for a thickness t= 0.4 mm of the transparent protective layer coated on the optical card.

However, such a design is not practical because of the disadvantages that the radius of curvature is too small, making manufacture of the objective very difficult, and a region (or image height) in which good imaging characteristics are obtained at diffraction limits is very small.

One feasible practical means of solving the above disadvantages is to interpose a parallelepiped plate between the objective and the optical card in order to compensate for the thickness of the protective layer. For example, the focal length of an objective in the prior art is set to F=4.5 mm for facilitating manufacture of the objective. The thickness of the protective layer theoretically necesarry for that setting is 1.17–1.26 mm, whereas the protective layer actually coated on the optical card is only 0.4 mm thick. As a result, what is needed is to interpose a parallelepiped plate having a thickness on the order of 0.77–0.86 mm, or a thickness equivalent to the difference therebetween.

However, this solution is not preferably because it contradicts the requirements of improved capability due to smaller size and weight of an optical system, and lowered cost due to a reduced number of parts.

In addition, the aforesaid disadvantages will be equally encountered in optical heads employed in optical information recording reproducers for recording and/or reproducing information, if a lens as disclosed in the above-stated embodiments is used as a collimating lens to collimate the divergent light beam emitted from a semiconductor laser, as a light source, with high efficiency and small loss of the amount of light. In other words, a parallelepiped plate of glass usually mounted on a semiconductor laser for protection has a thickness t on the order of about 0.25–0.35 mm.

SUMMARY OF THE INVENTION

It is an object of the present invention to overcome the disadvantages as mentioned above, and to provide an aspherical single lens by which aberration is satisfactorily corrected within an angle of view of about 1° through a parallelepiped plate having a thickness t of about 0.04 F–0.111 F.

The above object of the present invention is achieved by an aspherical single lens of the present invention described below.

The aspherical single lens according to the present invention is an aspherical single lens which has first and second surfaces both comprising aspherical surfaces represented by the following equation, and which meets the following conditions (1), (2) and (3), wherein a distance from any arbitrary point on either aspherical surface to a plane tangential to an apex of the aspherical surface is X, a distance from the arbitrary point to the optical axis is H, the radius of reference curvature of the $\nu$-th surface of said lens (i.e., the radius of curvature of the apex) is R $\nu$, a conical constant of the $\nu$-th surface is K $\nu$, and the aspherical coefficient of the $\nu$-th surface is A $\nu_i$ (i=3, 4, ...):

$$X = \frac{H^2/R\nu}{1 + \sqrt{1 - (1 + K\nu)(H/R\nu)^2}} + A\nu_3 H^3 + A\nu_4 H^4 + \ldots$$
$(\nu = 1, 2)$ $$(1) \quad 0.68 < \frac{(N-1)F^3}{N^2 R_1^3} < 0.73$$

$$(2) \quad 0.27 < \frac{(N-1)D}{NR_1} < 0.51$$

$$(3) \quad -0.40 < \frac{R_1}{R_2} < -0.26$$

where F is the focal length of the aspherical single lens, D is a thickness of the aspherical single lens along the optical axis, and N is an index of refraction of the aspherical single lens for a particular wavelength of light used with said lens.

DESCRIPTION OF THE PREFERRED EMBODIMENTS

Figure 1:
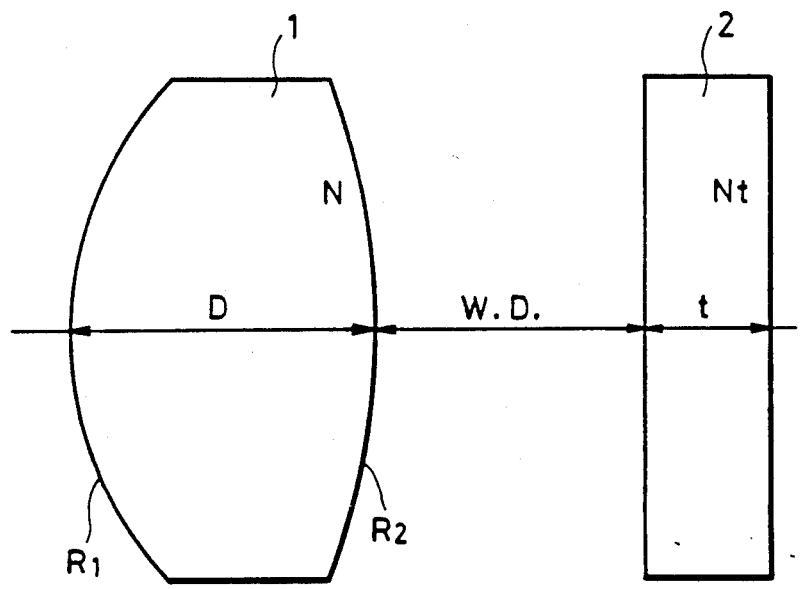
FIG. 1 is a view showing a lens section of an aspherical single lens according to the present invention.
Figure 2:
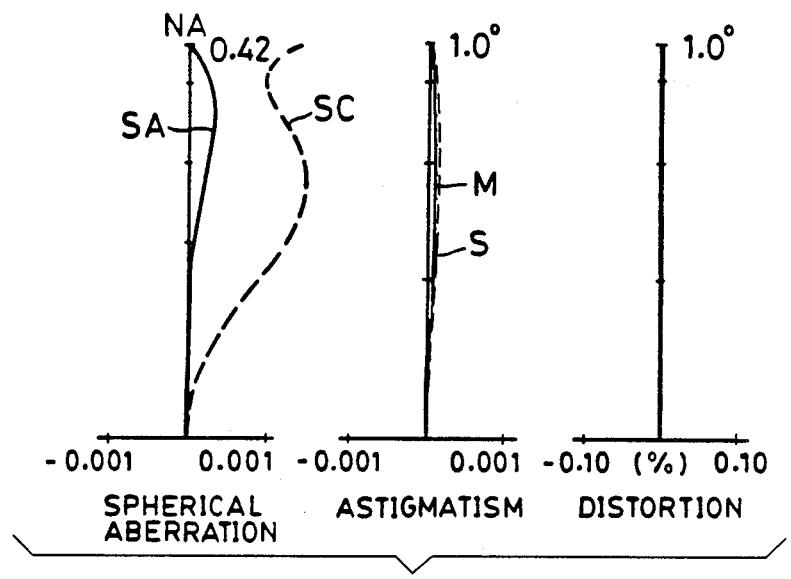
FIGS. 2, 3, 4, 5, 6, 7, 8, 9, 10, 11, 12, 13, 14, 15 and 16, are representations each showing spherical aberration, astigmatism and distortion in respective embodiments.
Figure 3:
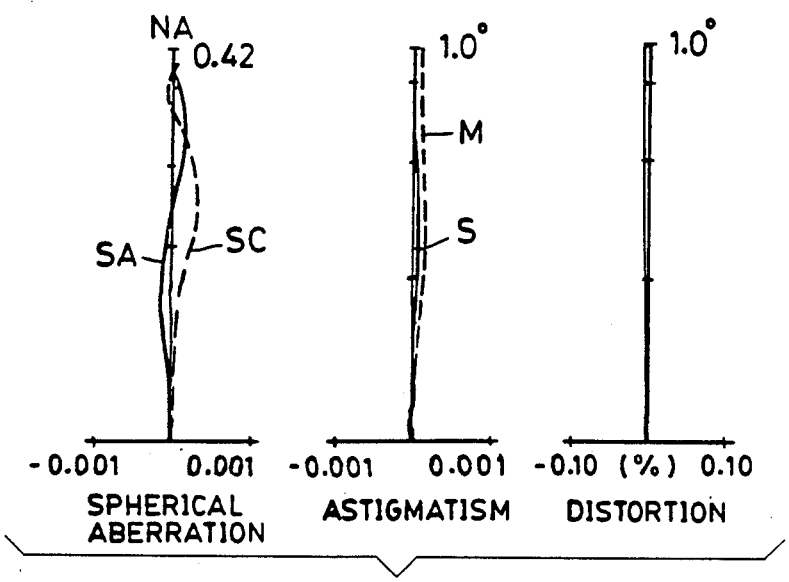
Figure 4:
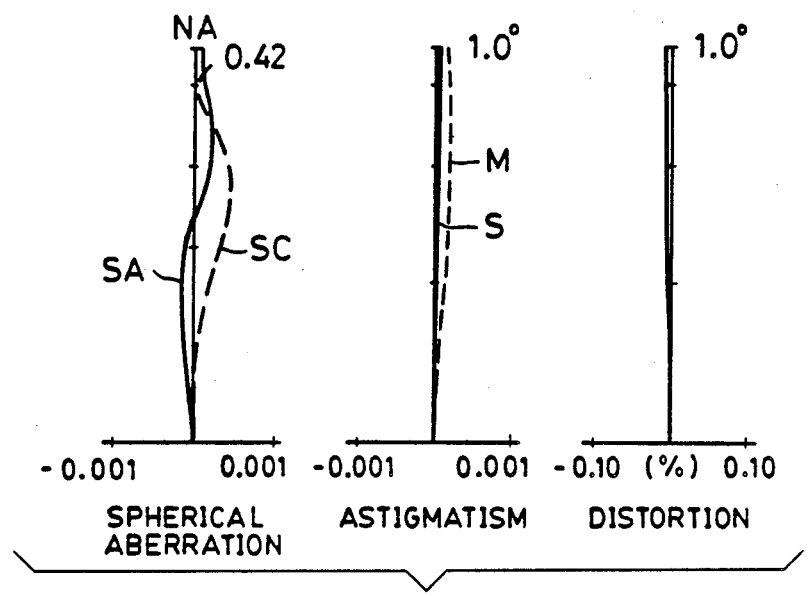
Figure 5:
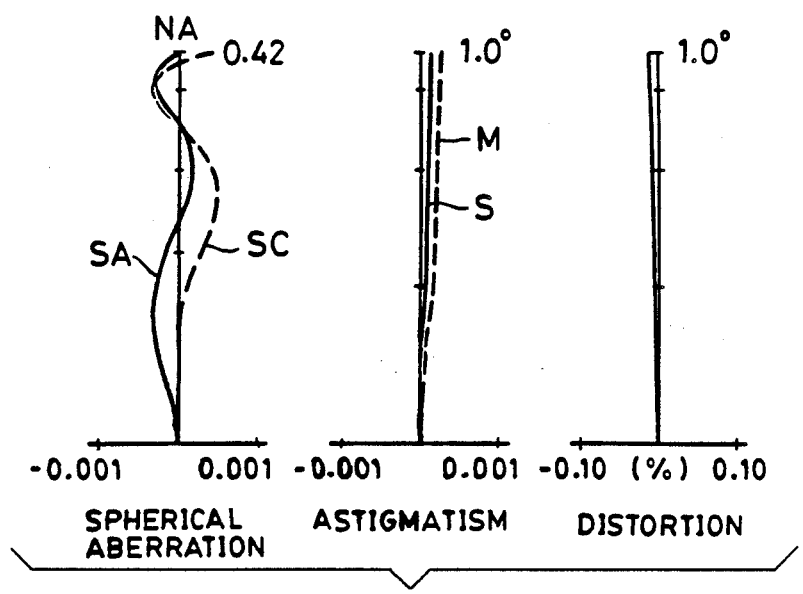
Figure 6:
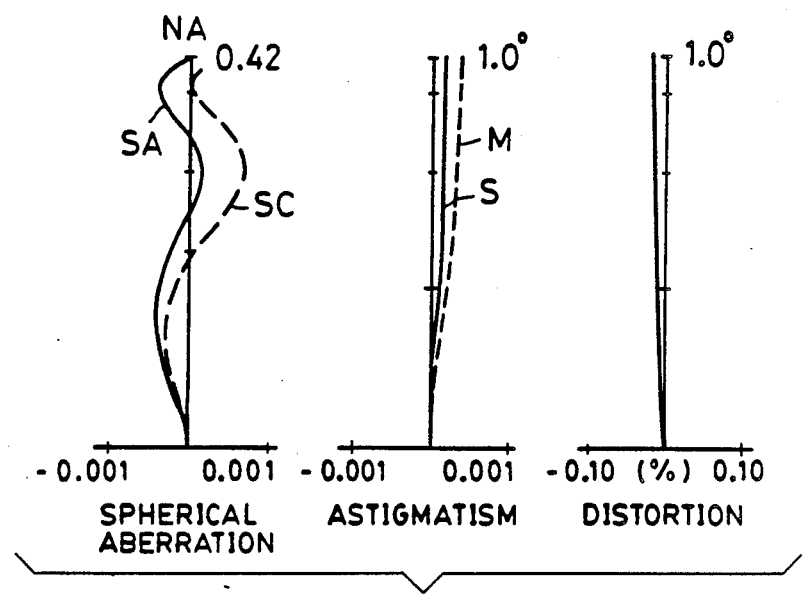
Figure 7:
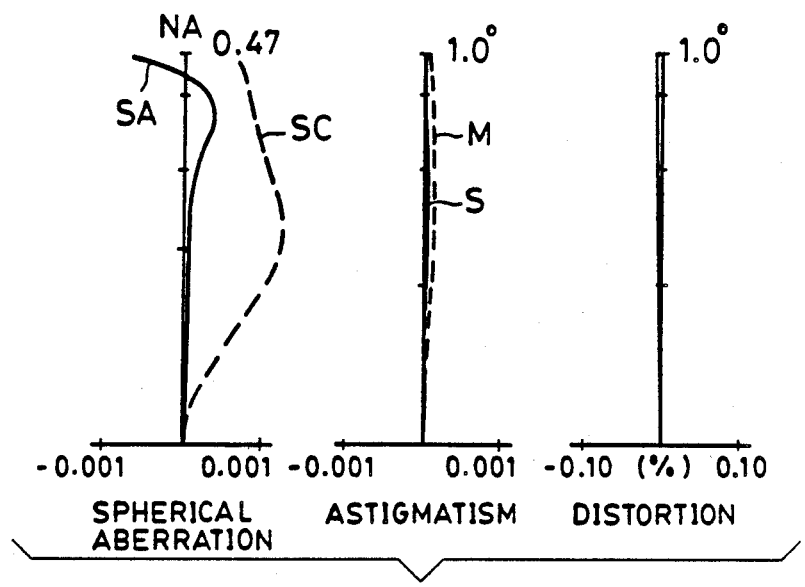
Figure 8:
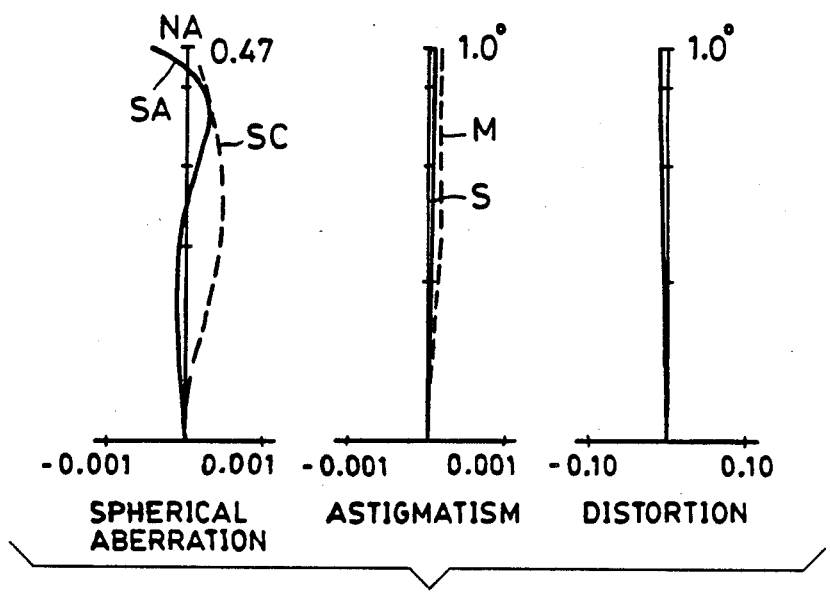
Figure 9:
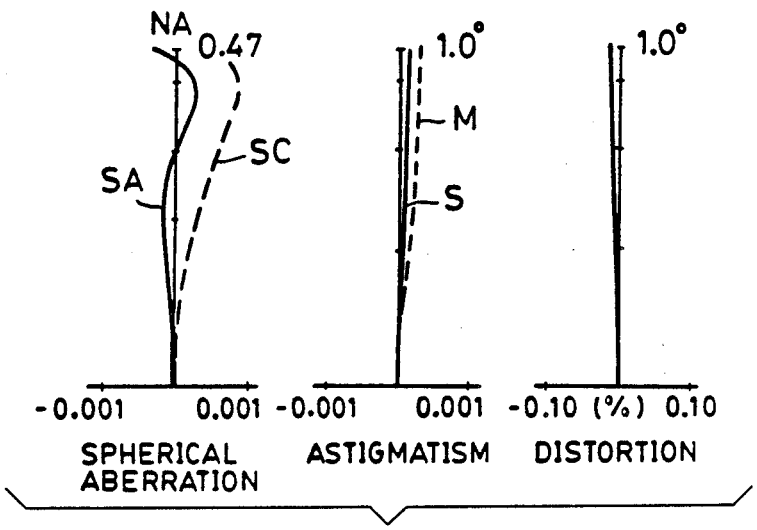
Figure 10:
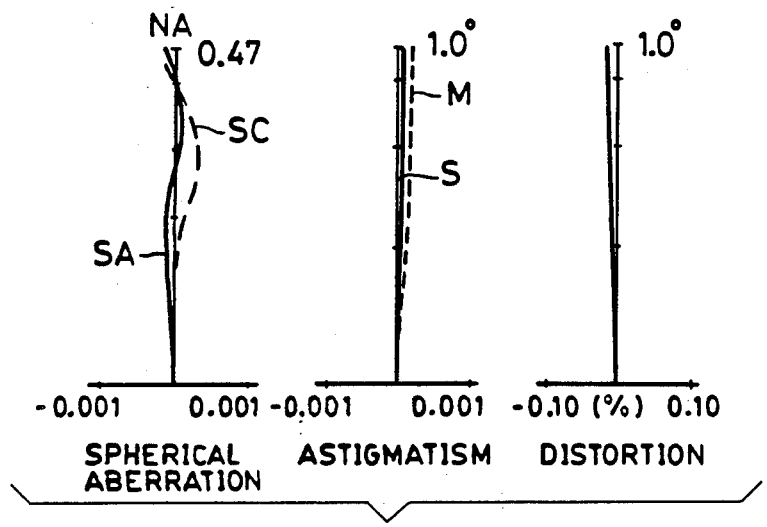
Figure 11:
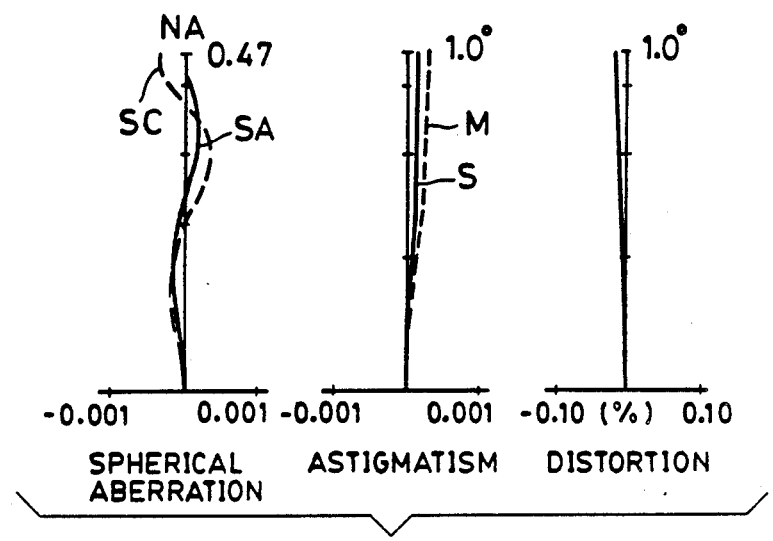
Figure 14:
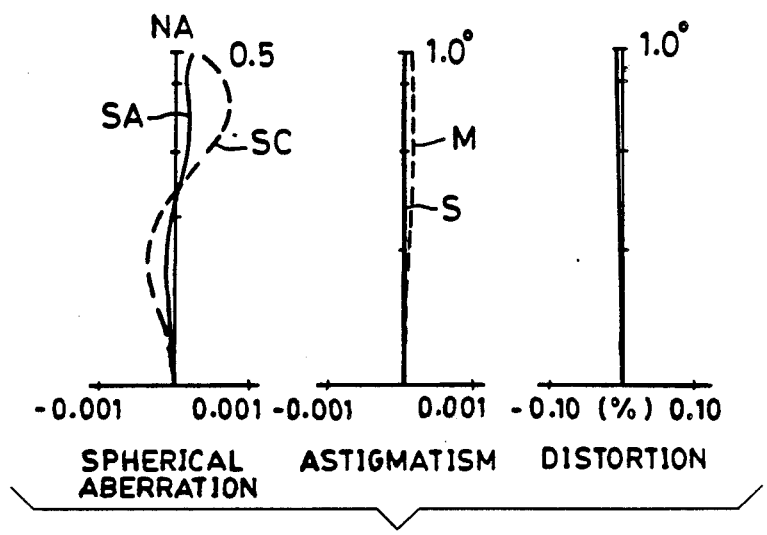
Figure 12:
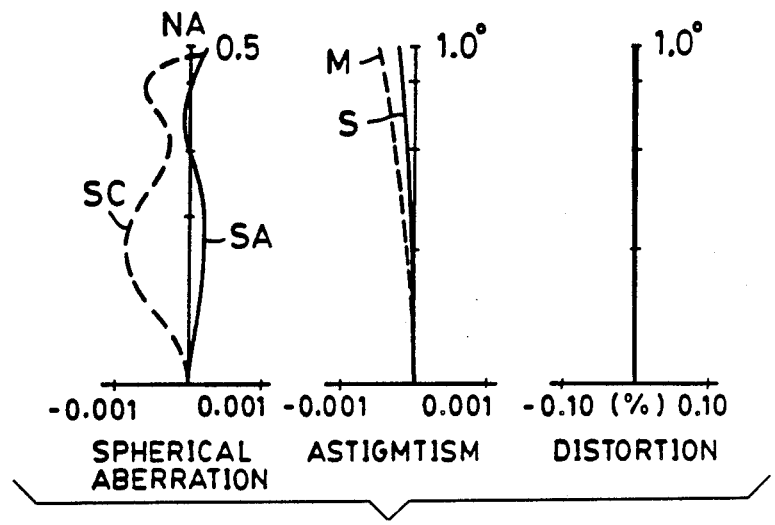
Figure 13:
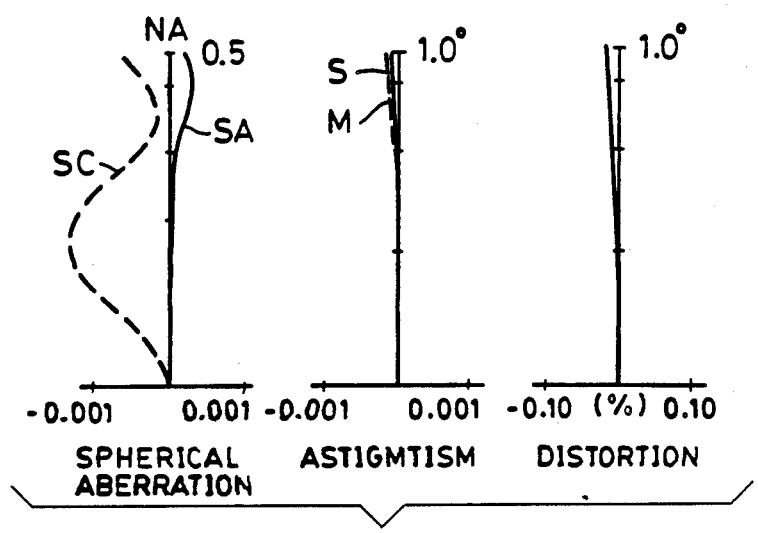

The aspherical single lens according to the present invention is an aspherical single lens which has first and second surfaces both comprising aspherical surfaces represented by the following equation, and which meets the following conditions (1), (2) and (3), wherein that a distance from any arbitrary point on either aspherical surface to a plane tangential to an apex of the aspherical surface is X, a distance from the arbitrary point to the optical axis is H, the radius of reference curvature of the $\nu$-th surface of said lens (i.e., the radius of curvature of the apex) is R $\nu$, a conical constant of the $\nu$-th surface is K $\nu$, and the aspherical coefficient of the $\nu$-th surface is A $\nu_i$ (i=3, 4, ...):

$$X = \frac{H^2/R\nu}{1 + \sqrt{1 - (1 + K\nu)(H/R\nu)^2}} + A\nu_3 H^3 + A\nu_4 H^4 + \ldots$$
$(\nu = 1, 2)$ $$(1) \quad 0.68 < \frac{(N-1)F^3}{N^2 R_1^3} < 0.73$$

$$(2) \quad 0.27 < \frac{(N-1)D}{NR_1} < 0.51$$

$$(3) \quad -0.40 < \frac{R_1}{R_2} < -0.26$$

where F is the focal length of the aspherical single lens, D is a thickness of the aspherical single lens along the optical axis, $R_1$ is the radius of paraxial curvature of said first aspherical surface, $R_2$ is the radius of paraxial curvature of said second aspherical surface and N is an index of refraction of the aspherical single lens for a particular wavelength of light used with said lens.

The above conditions (1) to (3) will now be explained. The conditions (1) and (2) of the present invention are chosen so as to satisfactorily correct both spherical aberration and coma in the tertiary region.

In accordance with "Lens Designing Method" by Yoshiya Matsui (Kyoritsu Publishing Co. Ltd., Japan), the tertiary spherical aberration coefficients $I_1$, $I_2$ of the first and second surfaces and the coma coefficients $II_1$, $II_2$ of the first and second surfaces are expressed as follows, assuming that an entrance pupil is coincident with the first surface and the distance to an object is at infinity:

$$I_1 = \left(\frac{1}{R_1}\right)^2 \left(\frac{N-1}{N^2 R_1}\right) + \psi_1$$

$$I_2 = \left(1 - \frac{D}{N} \cdot \frac{N-1}{R_1}\right)$$
$$\left[\left(1 - \frac{D}{N} \cdot \frac{N-1}{R_1}\right)\frac{N}{R_2} - \frac{N-1}{R_1}\right]^2$$
$$\left(1 - \frac{N-1}{N^2 R_1}\right) + \left(1 - \frac{D}{N} \cdot \frac{N-1}{R_1}\right)\psi_2$$

$$II_1 = \frac{N-1}{N^2 R_1^2}$$

$$II_2 = \left(1 - \frac{D}{N} \cdot \frac{N-1}{R_1}\right)$$
$$\left[\left(1 - \frac{D}{N} \cdot \frac{N-1}{R_1}\right)\frac{N}{R_2} - \frac{N-1}{R_1}\right]$$
$$\left(\frac{D}{R_2} + 1\right)\left(1 - \frac{N-1}{N^2 R_1}\right) +$$
$$\left(1 - \frac{D}{N} \cdot \frac{N-1}{R_1}\right)^3 \frac{D}{N} \psi_2$$

where $\psi_1$, $\psi_2$ are tertiary aspherical terms of the first and second surfaces, and $R_1$, $R_2$ are the radii of paraxial curvature of the first and second surfaces, respectively.

The tertiary spherical aberration coefficient I and coma coefficient II of the entire lens are given by the sum of the respective aberration coefficients of the first and second surfaces:

$$I = I_1 + I_2$$

$$II = II_1 + II_2$$

The lens configuration and the aspherical extents of the respective surfaces are to be determined so that I, II take proper values.

As will be seen from the foregoing equations, once the lens configuration (focal length, working distance, etc.) is determined, values of $R_1$, $R_2$, D, N become almost fixed and the remaining degree of freedom for setting proper values of the aberration coefficients I, II is given by only $\psi_1$, $\psi_2$. Accordingly, the lens configuration is required to be determined taking into account the correction of aberration to some degree. Numerical limit ranges to this end are expressed by the above conditions (1) and (2).

If the numerical limit range of the condition (1) is exceeded above or below, the spherical aberration of the first surface in particular would become too large to correct the aberration using the aspherical term $\psi_1$ of the first surface.

The condition (2) is aimed to correct the coma at the second surface in a well-balanced manner. If the numerical limit range of this condition is exceeded above or below, the aberration could not be corrected satisfactorily using the aspherical term $\psi_2$ of the second surface, resulting in a significant decrease of the off-axis imaging capability.

The condition (3) is primarily aimed to satisfy the sinusoidal condition. The present invention contemplates satisfactorily correcting not only on-axis aberration, but also off-axis aberration in a certain area, especially coma. However, deviation from the range of the condition (3) would depart from the isoplanar condition to a large degree, resulting in an unsatisfactory result. If the upper limit of the condition (3) is exceeded above, the radius of curvature of the first surface would become so small that a large extent of negative spherical aberration occurs, making it difficult to correct the aberration, and the working distance W·D would be so reduced as to cause difficulties from a practical geometry standpoint.

Hereinafter, preferred embodiments of an aspherical single lens of the present invention will be described.

As shown in FIG. 1, wherein F is the focal length of the lens, NA is the numerical aperture, $\beta$ is the paraxial transverse magnification, $R_1$ is the radius of paraxial curvature of the first aspherical surface, $R_2$ is the radius of paraxial curvature of the second aspherical surface, D is a thickness of the lens at the center thereof, W·D is a working distance, t is a thickness of the parallelepiped plate, Ni is an index of refraction of the lens for the particular wavelength $\lambda=380$ nm, Nt is an index of refraction of the parallelepiped plate for the particular wavelength $\lambda=830$ nm, and $\Delta\nu$ (j) ($\nu=1, 2$) is a difference in the direction of the optical axis between the aspherical surface at a j-division of the lens effective diameter determined by the NA (numerical aperture) in the $\nu$-th surface and the spherical surface has a radius of paraxial curvature that is R (where $\Delta\nu$ (j) is assumed to be positive in a direction in which the curvature of the aspherical surface decreases).

The configuration of the aspherical surface is represented by the following equation, assuming that a distance from any arbitrary point on the aspherical surface to a plane tangential to an apex of th aspherical surface is X, a distance from the arbitrary point to the optical axis is H, the radius of reference curvature of the $\nu$-th surface (i.e., the radius of curvature of the apex) is R $\nu$, a conical constant of the $\nu$-th surface is K $\nu$, and the aspherical coefficient of the $\nu$-th surface is A $\nu_i$ (i=3, 4, ...):

$$X = \frac{H^2/R\nu}{1 + \sqrt{1 - (1 + K\nu)(H/R\nu)^2}} + A\nu_3 H^3 + A\nu_4 H^4 + \ldots$$
$$(\nu = 1, 2)$$

Further, FIGS. 2, 3, 4, 5 and 6 are representations showing various types of aberration of the lens according to Embodiments 1, 2, 3, 4 and 5 of the present invention, respectively. Shown in each representation are spherical aberration, astigmatism and distortion. SA designates the spherical aberration, SC designates the extent of unsatisfaction to the sinusoidal condition, M designates an image surface curve in the meridional plane, and S designates and image surface curve in the sagittal plane.

Embodiment 1

| | | |
|---|---|---|
| F = 1.0 | NA = 0.42 | $\beta = 0$ |
| $R_1 = 0.68755$ | D = 0.66529 | N = 1.57532 |
| $R_2 = 2.27906$ | W·D = 0.58786 | |
| | t = 0.08871 | Nt = 1.510 |
| $K_1 = 6.28361 \times 10^{-2}$ | $K_2 = -7.00091 \times 10^1$ | |
| $A_{13} = -2.16317 \times 10^{-2}$ | $A_{23} = -3.35328 \times 10^{-3}$ | |
| $A_{14} = -4.24898 \times 10^{-2}$ | $A_{24} = -3.37362 \times 10^{-1}$ | |
| $A_{15} = -5.03660 \times 10^{-1}$ | $A_{25} = 1.75490 \times 10^{-1}$ | |
| $A_{16} = -1.36336 \times 10^{0}$ | $A_{26} = 3.64952 \times 10^{-1}$ | |
| $A_{17} = 1.54304 \times 10^{0}$ | $A_{27} = -3.01265 \times 10^{0}$ | |
| $A_{18} = 3.63946 \times 10^{0}$ | $A_{28} = 2.47448 \times 10^{0}$ | |
| $A_{19} = 4.33953 \times 10^{0}$ | $A_{29} = -2.85179 \times 10^{1}$ | |
| $A_{110} = -1.63823 \times 10^{0}$ | $A_{210} = 1.59293 \times 10^{1}$ | |
| $A_{111} = -3.89130 \times 10^{-5}$ | $A_{211} = 4.51401 \times 10^{-5}$ | |
| $A_{112} = 7.83997 \times 10^{-6}$ | $A_{212} = -8.89595 \times 10^{-6}$ | |
| $A_{113} = 3.70513 \times 10^{-6}$ | $A_{213} = 2.90965 \times 10^{-5}$ | |
| $A_{114} = -2.22663 \times 10^{-6}$ | $A_{214} = 5.13745 \times 10^{-6}$ | |
| $A_{115} = 5.06124 \times 10^{-7}$ | $A_{215} = 6.74467 \times 10^{-6}$ | |
| $A_{116} = 4.72031 \times 10^{-8}$ | $A_{216} = -1.11644 \times 10^{-5}$ | |

$$\frac{(N-1)F^3}{N^2 R_1^3} = 0.713 \qquad \frac{(N-1)D}{NR_1} = 0.354$$

$$\frac{R_1}{R_2} = -0.302 \qquad \frac{R_2}{F} = -2.28$$

| | |
|---|---|
| $\Delta_1(10) = 0.00724$ | $\Delta_2(10) = 0.00078$ |
| $\Delta_1(9) = 0.00541$ | $\Delta_2(9) = 0.00086$ |
| $\Delta_1(7) = 0.00208$ | $\Delta_2(7) = 0.00051$ |
| $\Delta_1(5) = 0.00051$ | $\Delta_2(5) = 0.00017$ |

Embodiment 2

| | | |
|---|---|---|
| F = 1.0 | NA = 0.42 | $\beta = 0$ |
| $R_1 = 0.68647$ | D = 0.73183 | N = 1.57532 |
| $R_2 = -2.16986$ | W·D = 0.55190 | |
| | t = 0.08871 | Nt = 1.510 |
| $K_1 = 5.20593 \times 10^{-2}$ | $K_2 = -6.79105 \times 10^1$ | |
| $A_{13} = -2.22406 \times 10^{-2}$ | $A_{23} = -1.13810 \times 10^{-2}$ | |
| $A_{14} = -6.84116 \times 10^{-2}$ | $A_{24} = -3.13410 \times 10^{-1}$ | |
| $A_{15} = -3.08303 \times 10^{-1}$ | $A_{25} = 7.17002 \times 10^{-2}$ | |
| $A_{16} = -1.35893 \times 10^{0}$ | $A_{26} = 4.28976 \times 10^{-1}$ | |
| $A_{17} = 7.34739 \times 10^{-1}$ | $A_{27} = -2.50630 \times 10^{0}$ | |
| $A_{18} = 3.24484 \times 10^{0}$ | $A_{28} = 4.67335 \times 10^{0}$ | |
| $A_{19} = 4.54175 \times 10^{0}$ | $A_{29} = -6.59390 \times 10^{0}$ | |
| $A_{110} = 5.93378 \times 10^{0}$ | $A_{210} = 1.46333 \times 10^{1}$ | |
| $A_{111} = -3.66118 \times 10^{-5}$ | $A_{211} = 4.77442 \times 10^{-6}$ | |
| $A_{112} = 7.82079 \times 10^{-6}$ | $A_{212} = -4.88410 \times 10^{-6}$ | |
| $A_{113} = 3.34636 \times 10^{-6}$ | $A_{213} = 2.44366 \times 10^{-5}$ | |
| $A_{114} = -2.20191 \times 10^{-6}$ | $A_{214} = -2.44219 \times 10^{-6}$ | |
| $A_{115} = 4.72685 \times 10^{-7}$ | $A_{215} = 5.84567 \times 10^{-6}$ | |
| $A_{116} = 1.55052 \times 10^{-8}$ | $A_{216} = -8.87000 \times 10^{-6}$ | |

$$\frac{(N-1)F^3}{N^2 R_1^3} = 0.717 \qquad \frac{(N-1)D}{NR_1} = 0.389$$

$$\frac{R_1}{R_2} = -0.316 \qquad \frac{R_2}{F} = -2.17$$

| | |
|---|---|
| $\Delta_1(10) = 0.00657$ | $\Delta_2(10) = 0.00152$ |
| $\Delta_1(9) = 0.00512$ | $\Delta_2(9) = 0.00112$ |
| $\Delta_1(7) = 0.00202$ | $\Delta_2(7) = 0.00051$ |
| $\Delta_1(5) = 0.00051$ | $\Delta_2(5) = 0.00015$ |

Embodiment 3

| | | |
|---|---|---|
| F = 1.0 | NA = 0.42 | $\beta = 0$ |
| $R_1 = 0.68780$ | D = 0.75403 | N = 1.57532 |

-continued

| | |
|---|---|
| $R_2 = 2.10947$ | $W \cdot D = 0.54087$ |
| | $t = 0.08871$ $\quad Nt = 1.510$ |
| $K_1 = 5.07475 \times 10^{-2}$ | $K_2 = -7.00444 \times 10^{1}$ |
| $A_{13} = -2.33838 \times 10^{-2}$ | $A_{23} = -1.55837 \times 10^{-2}$ |
| $A_{14} = -4.89668 \times 10^{-2}$ | $A_{24} = -3.30849 \times 10^{-1}$ |
| $A_{15} = -3.76532 \times 10^{-1}$ | $A_{25} = 8.20143 \times 10^{-2}$ |
| $A_{16} = -1.23402 \times 10^{0}$ | $A_{26} = 4.98421 \times 10^{-1}$ |
| $A_{17} = 7.50548 \times 10^{-1}$ | $A_{27} = -2.49824 \times 10^{0}$ |
| $A_{18} = 3.27949 \times 10^{0}$ | $A_{28} = 3.57727 \times 10^{0}$ |
| $A_{19} = 4.35688 \times 10^{0}$ | $A_{29} = -6.88698 \times 10^{0}$ |
| $A_{110} = 5.89298 \times 10^{0}$ | $A_{210} = 5.93651 \times 10^{1}$ |
| $A_{111} = -3.73027 \times 10^{-5}$ | $A_{211} = 5.21078 \times 10^{-6}$ |
| $A_{112} = 8.08037 \times 10^{-6}$ | $A_{212} = -2.49735 \times 10^{-5}$ |
| $A_{113} = 3.40408 \times 10^{-6}$ | $A_{213} = 2.45136 \times 10^{-5}$ |
| $A_{114} = -2.18674 \times 10^{-6}$ | $A_{214} = -2.99231 \times 10^{-6}$ |
| $A_{115} = 4.58225 \times 10^{-7}$ | $A_{215} = 6.65433 \times 10^{-6}$ |
| $A_{116} = 1.54052 \times 10^{-8}$ | $A_{216} = -8.98316 \times 10^{-6}$ |

$$\frac{(N-1)F^3}{N^2 R_1^3} = 0.713 \qquad \frac{(N-1)D}{NR_1} = 0.400$$

$$\frac{R_1}{R_2} = -0.326 \qquad \frac{R_2}{F} = -2.11$$

| | |
|---|---|
| $\Delta_1(10) = 0.00630$ | $\Delta_2(10) = 0.00172$ |
| $\Delta_1(9) = 0.00496$ | $\Delta_2(9) = 0.00122$ |
| $\Delta_1(7) = 0.00198$ | $\Delta_2(7) = 0.00053$ |
| $\Delta_1(5) = 0.00050$ | $\Delta_2(5) = 0.00016$ |

Embodiment 4

| | | |
|---|---|---|
| $F = 1.0$ | $NA = 0.42$ | $\beta = 0$ |
| $R_1 = 0.68781$ | $D = 0.79838$ | $N = 1.57532$ |
| $R_2 = -2.02646$ | $W \cdot D = 0.51732$ | |
| | $t = 0.08871$ | $Nt = 1.510$ |
| $K_1 = 3.97960 \times 10^{-2}$ | $K_2 = -7.80349 \times 10^{1}$ | |
| $A_{13} = -2.73614 \times 10^{-2}$ | $A_{23} = -2.46279 \times 10^{-2}$ | |
| $A_{14} = -2.06205 \times 10^{-2}$ | $A_{24} = -3.63186 \times 10^{-1}$ | |
| $A_{15} = -3.52632 \times 10^{-1}$ | $A_{25} = 6.56121 \times 10^{2}$ | |
| $A_{16} = -1.24433 \times 10^{0}$ | $A_{26} = 6.74671 \times 10^{-1}$ | |
| $A_{17} = 7.21406 \times 10^{-1}$ | $A_{27} = -2.28982 \times 10^{0}$ | |
| $A_{18} = 1.87860 \times 10^{0}$ | $A_{28} = 3.61906 \times 10^{0}$ | |
| $A_{19} = 5.94830 \times 10^{0}$ | $A_{29} = -6.75624 \times 10^{0}$ | |
| $A_{110} = 6.10239 \times 10^{0}$ | $A_{210} = 1.17621 \times 10^{2}$ | |
| $A_{111} = -3.35380 \times 10^{-5}$ | $A_{211} = 5.21078 \times 10^{-6}$ | |
| $A_{112} = 8.10202 \times 10^{-6}$ | $A_{212} = -2.49735 \times 10^{-5}$ | |
| $A_{113} = 3.41865 \times 10^{-6}$ | $A_{213} = 2.48567 \times 10^{-5}$ | |
| $A_{114} = -2.18053 \times 10^{-6}$ | $A_{214} = -2.43292 \times 10^{-6}$ | |
| $A_{115} = 4.01024 \times 10^{-7}$ | $A_{215} = -3.73073 \times 10^{-6}$ | |
| $A_{116} = -1.67946 \times 10^{-8}$ | $A_{216} = -1.02985 \times 10^{-5}$ | |

$$\frac{(N-1)F^3}{N^2 R_1^3} = 0.713 \qquad \frac{(N-1)D}{NR_1} = 0.424$$

$$\frac{R_1}{R_2} = -0.339 \qquad \frac{R_2}{F} = -2.03$$

| | |
|---|---|
| $\Delta_1(10) = 0.00641$ | $\Delta_2(10) = 0.00197$ |
| $\Delta_1(9) = 0.00492$ | $\Delta_2(9) = 0.00136$ |
| $\Delta_1(7) = 0.00192$ | $\Delta_2(7) = 0.00057$ |
| $\Delta_1(5) = 0.00049$ | $\Delta_2(5) = 0.00017$ |

Embodiment 5

| | | |
|---|---|---|
| $F = 1.0$ | $NA = 0.42$ | $\beta = 0$ |
| $R_1 = 0.68756$ | $D = 0.84270$ | $N = 1.57532$ |
| $R_2 = -1.94683$ | $W \cdot D = 0.49363$ | |
| | $t = 0.08871$ | $Nt = 1.510$ |
| $K_1 = 3.05536 \times 10^{-2}$ | $K_2 = -7.56830 \times 10^{1}$ | |
| $A_{13} = -3.26784 \times 10^{-2}$ | $A_{23} = -3.47628 \times 10^{-2}$ | |
| $A_{14} = 5.79908 \times 10^{-3}$ | $A_{24} = -3.21018 \times 10^{-1}$ | |
| $A_{15} = -3.36915 \times 10^{-1}$ | $A_{25} = 1.20435 \times 10^{-1}$ | |
| $A_{16} = -1.23850 \times 10^{0}$ | $A_{26} = 1.49034 \times 10^{0}$ | |
| $A_{17} = 6.45142 \times 10^{-1}$ | $A_{27} = -3.59431 \times 10^{0}$ | |
| $A_{18} = 1.88819 \times 10^{0}$ | $A_{28} = 4.37917 \times 10^{0}$ |
| $A_{19} = 5.65378 \times 10^{0}$ | $A_{29} = 6.35230 \times 10^{0}$ |
| $A_{110} = 6.85574 \times 10^{0}$ | $A_{210} = 8.77797 \times 10^{0}$ |
| $A_{111} = -3.26935 \times 10^{-5}$ | $A_{211} = 4.96850 \times 10^{-6}$ |
| $A_{112} = 8.10270 \times 10^{-6}$ | $A_{212} = -2.33107 \times 10^{-5}$ |
| $A_{113} = 3.48110 \times 10^{-6}$ | $A_{213} = 1.32798 \times 10^{-5}$ |
| $A_{114} = -2.18487 \times 10^{-6}$ | $A_{214} = -1.32597 \times 10^{-5}$ |
| $A_{115} = 3.59681 \times 10^{-7}$ | $A_{215} = -2.62954 \times 10^{-6}$ |
| $A_{116} = -1.92898 \times 10^{-8}$ | $A_{216} = 1.84736 \times 10^{-6}$ |

$$\frac{(N-1)F^3}{N^2 R_1^3} = 0.713 \qquad \frac{(N-1)D}{NR_1} = 0.448$$

$$\frac{R_1}{R_2} = -0.353 \qquad \frac{R_2}{F} = -1.95$$

| | |
|---|---|
| $\Delta_1(10) = 0.00608$ | $\Delta_2(10) = 0.00212$ |
| $\Delta_1(9) = 0.00472$ | $\Delta_2(9) = 0.00147$ |
| $\Delta_1(7) = 0.00187$ | $\Delta_2(7) = 0.00059$ |
| $\Delta_1(5) = 0.00049$ | $\Delta_2(5) = 0.00016$ |

The above Embodiments 1, 2, 3, 4 and 5 are designed with a focal length F of 4.5 mm, an NA of 0.42, and a thickness t of the parallelepiped plate that is 0.4 mm, thereby presenting an imaging capability close to diffraction limits within an angle of view of about 1°. Under the above conditions of NA and the angle of view, a good imaging capability can be obtained even for the thickness t of the parallelepiped plate varying in order of ± 0.1 mm. Thus, the range of t=0.3–0.5 mm can provide the good imaging capability. In other words, the good imaging capability is obtainable in a range oif 0.065 F<t<0.111 F.

The aspherical single lens of the present invention when conditioned on t/F≃0.4/4.5 and NA≃0.42, as seen in the above Embodiments 1, 2, 3, 4 and 5, is preferable to meet the following conditions (4) to (6) along with the above conditions (1) to (3).

$$0.70 < \frac{(N-1)F^3}{N^2 R_1^3} < 0.73 \qquad (4)$$

$$0.34 < \frac{(N-1)D}{NR_1} < 0.46 \qquad (5)$$

$$-0.36 < \frac{R_1}{R_2} < -0.29 \qquad (6)$$

The conditions (4), (5) are aimed to satisfactorily correct both spherical aberration and coma in the tertiary region.

If the numerical limit range of the condition (4) is exceeded above or below, the spherical aberration of the first surface in particular would become too large to correct the aberration using the aspherical term $\psi_1$ of the first surface.

The condition (5) is aimed to correct the coma at the second surface in a well-balanced manner. If the numerical limit range of this condition is exceeded above or below, the aberration could not be corrected satisfactorily using the aspherical term $\psi_2$ of the second surface, resulting in a significant decrease of the off-axis imaging capability.

The condition (6) is primarily aimed to satisfy the sinusoidal condition. The present invention contemplates satisfactorily correcting not only on-axis aberration, but also off-axis aberration in a certain area, especially coma. However, deviation from the range of the condition (6) would depert from the isoplanar condition to a large degree, resulting in an unsatisfactory result. If the upper limit of the condition (6) is exceeded above, the radius of curvature of the first surface would become so small that a large extent of negative spherical aberration occcurs, making it difficult to correct the aberration, and the working distance W·D would be so reduced as to cause difficulties from a practical geometry standpoint.

Furthermore, the aspherical single lens of the present invention conditioned on t/F≈1.4/4.5 and NA≈0.42 can satisfactorily correct, in particular, the spherical aberration by meeting the following conditions (7) to (10) along with the above conditions (1) to (6).

$$0.005F < \Delta_1(10) < 0.008F \quad (7)$$

$$0.0018F < \Delta_1(7) < 0.0022F \quad (8)$$

$$0.0005F < \Delta_2(10) < 0.0025F \quad (9)$$

$$0.0004F < \Delta_2(7) < 0.0007 \quad (10)$$

The conditions (7) to (10) are used to determine the aspherical extent at 10- and 7-division of the effective diameter of the lens first and second surfaces. Meeting the conditions (7) to (10) enables more satisfactory correction of the spherical aberration, in particular.

Exceeding above the upper limits of the conditions (7), (8) would result in an excessive extend of spherical aberration. On the other hand, exceeding below the lower limits of the conditions (7), (8) would result in a deficient extent of spherical aberration which deteriorates the on-axis imaging capability.

The conditions (9), (10) are primarily related to correction of the off-axis aberration. Deviation from the range of upper and lower limits would increase the extent of coma produced, resulting in deterioration of the off-axis imaging capability.

It is preferable for different correction of the spherical aberration to meet the following conditions;

$$0.004F < \Delta_1(9) < 0.006F \quad (11)$$

$$0.0004F < \Delta_1(5) < 0.0006F \quad (12)$$

and for different correction of the comad to meet the following conditions;

$$0.0005F < \Delta_2(9) < 0.002F \quad (13)$$

$$0.0001F < \Delta_2(5) < 0.0002F \quad (14)$$

along with the above conditions (1) to (10).

Here, the conditions (11) to (14) are used to determine the aspherical extent at 9- and 5-division of the effective diameter of the lens first and second surfaces.

It is further preferably for correction of the aberration to meet the following condition (15) along with the above conditions (1) to (10):

$$-2.4 < \frac{R_2}{F} < -1.8 \quad (15)$$

If the lower limit of the condition (15) is exceeded below, the astigmatism would become excessive. If the upper limit is exceeded above, the coma would remain, leading to an unsatisfactory result.

Hereinafter, other preferred embodiments of the aspherical single lens of the present invention will be described.

As shown in FIG. 1, let it to be assumed that F is the focal length of the lens, NA is the numerical aperature, $\beta$ is the paraxial transverse magnification, $R_1$ is the radius of paraxial curvature of the first aspherical surface, $R_2$ is the radius of paraxial curvature of the second aspherical surface, D is a thickness of the lens at the center thereof, W·D is a working distance, t is a thickness of the parallelepiped plate, Ni is an index of refraction of the lens for the particular wavelength $\lambda = 830$ nm, Nt is an index of refraction of the parallelepiped plate for the particular wavelength $\lambda = 830$ nm, and $\Delta \nu$ (j) ($\nu = 1, 2$) is a difference in the direction of the optical axis between the aspherical surface at j-division of the lens effective diameter determined by the NA (numerical aperture) in the $\nu$-th surface and the spherical surface has a radius of paraxial curvature that is R (where $\Delta \nu$ (j) is assumed to be positive in a direction in which the curvature of the aspherical surface decreases).

The configuration of the aspherical surface is represented by the following equation, assuming that a distance from any arbitrary point on the aspherical surface to a plane tangential to an apex of the aspherical surface is X, a distance from the arbitrary point to the optical axis is H, the radius oif reference curvature of the $\nu$-th surface (i.e., the radius of curvature of the apex) is R $\nu$, a conical constant of the $\nu$-th surface is K $\nu$, and the aspherical coefficient of the $\nu$-th surface is A $\nu_i$ (i=3, 4, ...):

$$X = \frac{H^2/R\nu}{1 + \sqrt{1 - (1 + K\nu)(H/R\nu)^2}} + A\nu_3 H^3 + A\nu_4 H^4 + \ldots$$

$$(\nu = 1, 2)$$

Further, FIGS. 7, 8, 9, 10 and 11 are representations showing various types of aberration of the lens according to Embodiments 6, 7, 8, 9 and 10 of the present invention, respectively. Shown in each representation are spherical aberration, astigmatism and distortion. SA designates the spherical aberration, SC designates the extent of unsatisfaction to the sinusoidal condition, M designates an image surface curve in themeridional plane, and S designates an image surface curve in the sagittal plane.

Embodiment 6

| | | |
|---|---|---|
| F = 1.0 | NA = 0.47 | $\beta = 0$ |
| $R_1$ = 0.68754 | D = 0.77662 | N = 1.57532 |
| $R_2$ = −2.07077 | W · D = 0.54341 | |
| | t = 0.06653 | Nt = 1.510 |
| $K_1$ = 2.22488 × $10^{-2}$ | $K_2$ = −7.00400 × $10^1$ | |
| $A_{13}$ = 2.14320 × $10^{-2}$ | $A_{23}$ = −1.72085 × $10^{-2}$ | |
| $A_{14}$ = −5.19200 × $10^{-2}$ | $A_{24}$ = −2.35772 × $10^{-1}$ | |
| $A_{15}$ = −2.96041 × $10^{-1}$ | $A_{25}$ = −3.52770 × $10^{-1}$ | |
| $A_{16}$ = −1.26544 × $10^0$ | $A_{26}$ = 1.62899 × $10^0$ | |
| $A_{17}$ = 8.42816 × $10^{-1}$ | $A_{27}$ = −4.02051 × $10^0$ | |
| $A_{18}$ = 2.04761 × $10^0$ | $A_{28}$ = 2.13750 × $10^{-1}$ | |
| $A_{19}$ = 5.32620 × $10^0$ | $A_{29}$ = 1.45131 × $10^1$ | |
| $A_{110}$ = 5.14725 × $10^0$ | $A_{210}$ = 6.48502 × $10^0$ | |
| $A_{111}$ = −3.33063 × $10^{-5}$ | $A_{211}$ = 4.76052 × $10^{-6}$ | |
| $A_{112}$ = 7.88360 × $10^{-6}$ | $A_{212}$ = −1.35632 × $10^{-5}$ | |
| $A_{113}$ = 2.86341 × $10^{-6}$ | $A_{213}$ = 1.07469 × $10^{-5}$ | |
| $A_{114}$ = −1.82936 × $10^{-6}$ | $A_{214}$ = −1.65195 × $10^{-6}$ | |
| $A_{115}$ = 3.44032 × $10^{-7}$ | $A_{215}$ = 5.95045 × $10^{-7}$ | |
| $A_{116}$ = −1.90544 × $10^{-9}$ | $A_{216}$ = −1.43275 × $10^{-6}$ | |
| $\frac{(N-1)F^3}{N^2 R_1^3}$ = 0.713 | $\frac{(N-1)D}{NR_1}$ = 0.413 | |

$$\frac{R_1}{R_2} = -0.332 \qquad \frac{R_2}{F} = -2.07$$

$\Delta_1(10) = 0.00658 \qquad \Delta_2(10) = 0.00289$
$\Delta_1(9) = 0.00672 \qquad \Delta_2(9) = 0.00211$
$\Delta_1(7) = 0.00305 \qquad \Delta_2(7) = 0.00098$
$\Delta_1(5) = 0.00077 \qquad \Delta_2(5) = 0.00031$

Embodiment 7

$F = 1.0 \qquad NA = 0.47 \qquad \beta = 0$
$R_1 = 0.68814 \qquad D = 0.82172 \qquad N = 1.57532$
$R_2 = -1.97884 \qquad W \cdot D = 0.51983$
$\qquad t = 0.06654 \qquad Nt = 1.510$
$K_1 = 3.43328 \times 10^{-2} \qquad K_2 = -7.21457 \times 10^1$
$A_{13} = -2.49918 \times 10^{-2} \qquad A_{23} = -2.64123 \times 10^{-2}$
$A_{14} = -4.54385 \times 10^{-2} \qquad A_{24} = -3.18729 \times 10^{-1}$
$A_{15} = -2.83119 \times 10^{-1} \qquad A_{25} = -1.26877 \times 10^{-1}$
$A_{16} = -1.24364 \times 10^0 \qquad A_{26} = 2.20196 \times 10^0$
$A_{17} = 7.83725 \times 10^{-1} \qquad A_{27} = -4.87064 \times 10^0$
$A_{18} = 1.84642 \times 10^0 \qquad A_{28} = -1.00041 \times 10^{-1}$
$A_{19} = 5.43972 \times 10^0 \qquad A_{29} = 1.43513 \times 10^1$
$A_{110} = 4.94049 \times 10^0 \qquad A_{210} = 4.19918 \times 10^{-1}$
$A_{111} = -3.33180 \times 10^{-5} \qquad A_{211} = 3.28153 \times 10^{-6}$
$A_{112} = 8.01624 \times 10^{-6} \qquad A_{212} = -1.35856 \times 10^{-5}$
$A_{113} = 3.40693 \times 10^{-6} \qquad A_{213} = 1.16736 \times 10^{-5}$
$A_{114} = -2.05618 \times 10^{-6} \qquad A_{214} = -1.66002 \times 10^{-6}$
$A_{115} = 3.43040 \times 10^{-7} \qquad A_{215} = 5.10681 \times 10^{-7}$
$A_{116} = 1.13037 \times 10^{-9} \qquad A_{216} = -1.55776 = 10^{-6}$ $$\frac{(N-1)F^3}{N^2 R_1^3} = 0.711 \qquad \frac{(N-1)D}{NR_1} = 0.436$$

$$\frac{R_1}{R_2} = -0.348 \qquad \frac{R_2}{F} = -1.98$$

$\Delta_1(10) = 0.00647 \qquad \Delta_2(10) = 0.00304$
$\Delta_1(9) = 0.00657 \qquad \Delta_2(9) = 0.00218$
$\Delta_1(7) = 0.00299 \qquad \Delta_2(7) = 0.00095$
$\Delta_1(5) = 0.00077 \qquad \Delta_2(5) = 0.00028$

Embodiment 8

$F = 1.0 \qquad NA = 0.47 \qquad \beta = 0$
$R_1 = 0.68746 \qquad D = 0.86611 \qquad N = 1.57532$
$R_2 = -1.90418 \qquad W \cdot D = 0.49581$
$\qquad t = 0.06654 \qquad Nt = 1.510$
$K_1 = 3.43135 \times 10^{-2} \qquad K_2 = -7.45115 \times 10^1$
$A_{13} = -2.81689 \times 10^{-2} \qquad A_{23} = -3.58902 \times 10^{-2}$
$A_{14} = -3.30653 \times 10^{-2} \qquad A_{24} = -3.22769 \times 10^{-1}$
$A_{15} = -2.56224 \times 10^{-1} \qquad A_{25} = 1.10918 \times 10^{-1}$
$A_{16} = -1.23347 \times 10^0 \qquad A_{26} = 1.99634 \times 10^0$
$A_{17} = 7.64429 \times 10^{-1} \qquad A_{27} = -4.40615 \times 10^0$
$A_{18} = 1.60759 \times 10^0 \qquad A_{28} = 3.20784 \times 10^{-1}$
$A_{19} = 5.49206 \times 10^0 \qquad A_{29} = 1.43888 \times 10^1$
$A_{110} = 5.18999 \times 10^0 \qquad A_{210} = -2.50794 \times 10^1$
$A_{111} = -3.29995 \times 10^{-5} \qquad A_{211} = 3.69678 \times 10^{-6}$
$A_{112} = 8.04748 \times 10^{-6} \qquad A_{212} = -1.3628 \times 10^{-5}$
$A_{113} = 3.39678 \times 10^{-6} \qquad A_{213} = 6.14399 \times 10^{-8}$
$A_{114} = -2.02564 \times 10^{-6} \qquad A_{214} = -4.03268 \times 10^{-7}$
$A_{115} = 3.38730 \times 10^{-7} \qquad A_{215} = 1.16566 \times 10^{-5}$
$A_{116} = -6.12022 \times 10^{-9} \qquad A_{216} = -1.10195 \times 10^{-6}$ $$\frac{(N-1)F^3}{N^2 R_1^3} = 0.714 \qquad \frac{(N-1)D}{NR_1} = 0.460$$

$$\frac{R_1}{R_2} = -0.361 \qquad \frac{R_2}{F} = -1.90$$

$\Delta_1(10) = 0.00594 \qquad \Delta_2(10) = 0.00334$
$\Delta_1(9) = 0.00622 \qquad \Delta_2(9) = 0.00238$
$\Delta_1(7) = 0.00288 \qquad \Delta_2(7) = 0.00101$
$\Delta_1(5) = 0.00075 \qquad \Delta_2(5) = 0.00029$

Embodiment 9

$F = 1.0 \qquad NA = 0.47 \qquad \beta = 0$
$R_1 = 0.68867 \qquad D = 0.88889 \qquad N = 1.57532$
$R_2 = -1.84771 \qquad W \cdot D = 0.48446$
$\qquad t = 0.06667 \qquad Nt = 1.510$
$K_1 = 3.17260 \times 10^{-2} \qquad K_2 = -6.78021 \times 10^1$
$A_{13} = -2.32442 \times 10^{-2} \qquad A_{23} = -3.80066 \times 10^{-2}$
$A_{14} = -5.41829 \times 10^{-2} \qquad A_{24} = -2.50428 \times 10^{-1}$
$A_{15} = -2.82427 \times 10^{-1} \qquad A_{25} = -7.03330 \times 10^{-2}$
$A_{16} = -1.04034 \times 10^0 \qquad A_{26} = 1.87137 \times 10^0$
$A_{17} = 7.97214 \times 10^{-1} \qquad A_{27} = -2.68110 \times 10^0$
$A_{18} = 1.75503 \times 10^0 \qquad A_{28} = -2.85849 \times 10^0$
$A_{19} = 5.32803 \times 10^0 \qquad A_{29} = 9.92178 \times 10^0$
$A_{110} = -1.31536 \times 10^0 \qquad A_{210} = -1.49024 \times 10^1$
$A_{111} = -3.32477 \times 10^{-5} \qquad A_{211} = -2.20336 \times 10^{-6}$
$A_{112} = 1.02202 \times 10^{-5} \qquad A_{212} = -7.27432 \times 10^{-6}$
$A_{113} = 2.86361 \times 10^{-6} \qquad A_{213} = 1.16742 \times 10^{-5}$
$A_{114} = -1.84403 \times 10^{-6} \qquad A_{214} = -3.11163 \times 10^{-7}$
$A_{115} = 3.31557 \times 10^{-7} \qquad A_{215} = -2.34088 \times 10^{-7}$
$A_{116} = -2.65349 \times 10^{-8} \qquad A_{216} = -1.08451 \times 10^{-6}$ $$\frac{(N-1)F^3}{N^2 R_1^3} = 0.710 \qquad \frac{(N-1)D}{NR_1} = 0.471$$

$$\frac{R_1}{R_2} = -0.373 \qquad \frac{R_2}{F} = -1.85$$

$\Delta_1(10) = 0.00816 \qquad \Delta_2(10) = 0.00332$
$\Delta_1(9) = 0.00686 \qquad \Delta_2(9) = 0.00236$
$\Delta_1(7) = 0.00289 \qquad \Delta_2(7) = 0.00099$
$\Delta_1(5) = 0.00074 \qquad \Delta_2(5) = 0.00028$

Embodiment 10

$F = 1.0 \qquad NA = 0.47 \qquad \beta = 0$
$R_1 = 0.68673 \qquad D = 0.93147 \qquad N = 1.57532$
$R_2 = 1.78956 \qquad W \cdot D = 0.46057$
$\qquad t = 0.06653 \qquad Nt = 1.510$
$K_1 = 3.06362 \times 10^{-2} \qquad K_2 = -7.11075 \times 10^1$
$A_{13} = -2.60717 \times 10^{-2} \qquad A_{23} = -4.51875 \times 10^{-2}$
$A_{14} = -3.09516 \times 10^{-2} \qquad A_{24} = -2.28284 \times 10^{-1}$
$A_{15} = -2.79953 \times 10^{-1} \qquad A_{25} = -6.01062 \times 10^{-2}$
$A_{16} = -1.19755 \times 10^0 \qquad A_{26} = 1.92250 \times 10^0$
$A_{17} = 7.98588 \times 10^{-1} \qquad A_{27} = -8.92777 \times 10^{-1}$
$A_{18} = 2.91033 \times 10^0 \qquad A_{28} = 1.00164 \times 10^{-1}$
$A_{19} = 5.21606 \times 10^0 \qquad A_{29} = 6.91414 \times 10^{-1}$
$A_{110} = -8.51268 \times 10^0 \qquad A_{210} = -8.43895 \times 10^1$
$A_{111} = -3.31804 \times 10^{-5} \qquad A_{211} = -3.08490 \times 10^{-5}$
$A_{112} = 1.43247 \times 10^{-5} \qquad A_{212} = 4.39181 \times 10^{-6}$
$A_{113} = 2.84211 \times 10^{-6} \qquad A_{213} = 9.03455 \times 10^{-6}$
$A_{114} = -2.77470 \times 10^{-6} \qquad A_{214} = 9.38376 \times 10^{-6}$
$A_{115} = 3.33257 \times 10^{-7} \qquad A_{215} = 4.99674 \times 10^{-6}$
$A_{116} = 4.88828 \times 10^{-8} \qquad A_{216} = -1.61383 \times 10^{-6}$ $$\frac{(N-1)F^3}{N^2 R_1^3} = 0.716 \qquad \frac{(N-1)D}{NR_1} = 0.495$$

$$\frac{R_1}{R_2} = -0.384 \qquad \frac{R_2}{F} = -1.79$$

$\Delta_1(10) = 0.01014 \qquad \Delta_2(10) = 0.00343$
$\Delta_1(9) = 0.00739 \qquad \Delta_2(9) = 0.00244$
$\Delta_1(7) = 0.00289 \qquad \Delta_2(7) = 0.00101$
$\Delta_1(5) = 0.00073 \qquad \Delta_2(5) = 0.00028$ The above Embodiments 6, 7, 8, 9 and 10 are designed with a focal length F that is 4.5 mm, an NA of 0.47, and a thickness t of the parallelepiped plate that is 0.3 mm, thereby presenting the imaging capability close to diffraction limits within an angle of view of about 1°. Under the above conditions of NA and the angle of view, a good imaging capability can be obtained even for a thickness t of the parallelepiped plate that varies on the order of ±0.1 mm. Thus, the range of t=0.2-0.4 mm can provide a good imaging capability. In other words, a good imaging capability is obtainable in a range of 0.04 F<t<0.09 F.

An aspherical single lens of the present invention that is conditioned on t/F≃0.3/4.5 and NA≃0.47, as seen in the above Embodiments 6, 7, 8, 9 and 10, is preferable to meet the following conditions (16) to (18) along with the above conditions (1) to (3).

$$0.70 < \frac{(N-1)F^3}{N^2 R_1^3} < 0.73 \quad (16)$$

$$0.40 < \frac{(N-1)D}{NR_1} < 0.51 \quad (17)$$

$$-0.40 < \frac{R_1}{R_2} < -0.31 \quad (18)$$

The conditions (16), (17) are aimed to satisfactorily correct both spherical aberration and coma in the tertiary region.

If the numerical limit range of the condition (16) is exceeded above or below, the spherical aberration of the first surface in particular would become too large to correct the aberration using the aspherical term $\psi_1$ of the first surface.

The condition (17) is aimed to correct the coma at the second surface in a well-balanced manner. If the numerical limit range of this condition is exceeded above or below, the aberration could not be corrected satisfactorily using the aspherical term $\psi_2$ of the second surface, resulting in a significant decrease of the off-axis imaging capability.

The condition (18) is primarily aimed to satisfy the sinusoidal condition. The present invention contemplates satisfactorily correcting not only on-axis aberration, but also off-axis aberration in a certain area, especially coma. However, deviation from the range of the condition (18) would depart from the isoplanar condition to a large degree, resulting in the unsatisfactory result. If the upper limit of the condition (18) is exceeded above, the radius of curvature of the first surface would become so small that a large extent of negative spherical aberration occurs, making it difficult to correct the aberration, and the working distance W·D would be so reduced as to cause difficulties from a practical geometry standpoint.

Furthermore, an aspherical single lens of the present invention that is conditioned on t/F≃0.3/4.5 and NA≃0.42 can satisfactorily correct, in particular, the spherical aberration by meeting the following conditions (19) to (22) along with the above conditions (1) to (3) and (16) to (18).

$$0.005F < \Delta_1(10) < 0.011F \quad (19)$$

$$0.0027F < \Delta_1(7) < 0.0032F \quad (20)$$

$$0.0027F < \Delta_2(10) < 0.0036F \quad (21)$$

$$0.0009F < \Delta_2(7) < 0.0011F \quad (22)$$

The conditions (19) to (22) are used to determine the aspherical extent at 10- and 7-division of the effective diameter of the lens first and second surfaces. Meeting the conditions (19) to (22) enables more satisfactory correction of the spherical aberration, in particular.

Exceeding above the upper limits of the conditions (19), (20) would result in an excessive extent of the spherical aberration. On the other hand, exceeding below the lower limits of the conditions (19), (20) would result in a deficient extent of spherical aberration which deteriorates the on-axis imaging capability.

The conditions (21), (22) are primarily related to correction of the off-axis aberration. Deviation from the range of upper and lower limits would increase the extent of coma produced, resulting in deterioration of the off-axis imaging capability.

It is preferable for different correction of the spherical aberration to meet the following conditions;

$$0.006F < \Delta_1(9) < 0.008F \quad (23)$$

$$0.0007F < \Delta_1(5) < 0.0008F \quad (24)$$

and for different correction of the coma to meet the following conditions;

$$0.002F < \Delta_2(9) < 0.003F \quad (25)$$

$$0.0002F < \Delta_2(5) < 0.0003F \quad (26)$$

along with the above conditions (1) to (3) and (16) to (18).

Here, the conditions (23) to (26) are used to determine the aspherical extent at 9- and 5-division of the effective diameter of the lens first and second surfaces.

It is further preferable for correction of the aberration to meet the following condition (27) along with the above conditions (1) to (3) and (16) to (18):

$$-2.2 < \frac{R_2}{F} < -1.7 \quad (27)$$

If the lower limit of the condition (27) is exceeded below, the astigmatism would become excessive. If the upper limit is exceeded above, the coma would remain, leading to the unsatisfactory result.

Hereinafter, still other preferred embodiments of an aspherical single lens of the present invention will be described.

As shown in FIG. 1, let it to be assumed that F is the focal length of the lens, NA is the numerical aperture, $\beta$ is the paraxial transverse magnification, $R_1$ is the radius of paraxial curvature of the first aspherical surface, $R_2$ is the radius of paraxial curvature of the second aspherical surface, D is a thickness of the lens at the center thereof, W·D is a working distance, t is a thickness of the parallelepiped plate, Ni is an index of refraction of the lens for the particular wavelength $\lambda$=830 nm, Nt is an index of refraction of the parallelepiped plate for the particular wavelength $\lambda$=830 nm, and $\Delta\nu(j)$ ($\nu$=1, 2) is a difference in the direction of the optical axis between the aspherical surface at a j-division of the lens effective diameter determined by the NA (numerical aperture) in the $\nu$-th surface and the spherical surface has a radius of paraxial curvature that is R (where $\Delta\nu(j)$ is assumed to be positive in a direction in which the curvature of the aspherical surface decreases).

The configuration of the aspherical surface is represented by the following equation, assuming that a distance from any arbitrary point on the aspherical surface to a plane tangential to an apex of the aspherical surface is X, a distance from the arbitrary point to the optical axis is H, the radius of reference curvature of the $\nu$-th surface (i.e., the radius of curvature of the apex) is $R\nu$, a conical constant of the $\nu$-th surface is $K\nu$, and the aspherical coefficient of the $\nu$-th surface is $A\nu_i$ ($i=3, 4, \ldots$):

$$X = \frac{H^2/R\nu}{1 + \sqrt{1 - (1 + K\nu)(H/R\nu)^2}} + A\nu_3 H^3 + A\nu_4 H^4 + \ldots$$
$$(\nu = 1, 2)$$

Further, FIGS. 7, 8, 9, 10 and 11 are representations showing various types of aberration of the lens according to Embodiments 6, 7, 8, 9 and 10 of the present invention, respectively. Shown in each representation are spherical aberration, astigmatism and distortion. SA designates the spherical aberration, SC designates the extent of unsatisfaction to the sinusoidal condition, M designates an image surface curve in the meridional plane, and S designates an image surface curve in the sagittal plane.

Embodiment 11

| | |
|---|---|
| F = 1.0 | NA = 0.50 $\quad$ $\beta = 0$ |
| $R_1$ = 0.68769 | D = 0.60633 $\quad$ N = 1.57532 |
| $R_2$ = −2.38714 | W · D = 0.61924 |
| | t = 0.08871 $\quad$ Nt = 1.510 |
| $K_1$ = −7.43082 × $10^{-3}$ | $K_2$ = −6.09045 × $10^1$ |
| $A_{13}$ = −1.10638 × $10^{-2}$ | $A_{23}$ = −7.19034 × $10^{-2}$ |
| $A_{14}$ = −2.98267 × $10^{-1}$ | $A_{24}$ = −2.01016 × $10^{-2}$ |
| $A_{15}$ = 2.96427 × $10^{-1}$ | $A_{25}$ = −5.04343 × $10^{-1}$ |
| $A_{16}$ = −1.21161 × $10^{0}$ | $A_{26}$ = 1.33064 × $10^{0}$ |
| $A_{17}$ = −6.11878 × $10^{-1}$ | $A_{27}$ = −3.78361 × $10^{0}$ |
| $A_{18}$ = 1.49100 × $10^{0}$ | $A_{28}$ = 4.48779 × $10^{0}$ |
| $A_{19}$ = 1.44201 × $10^{1}$ | $A_{29}$ = −2.95692 × $10^{0}$ |
| $A_{110}$ = −2.50171 × $10^{1}$ | $A_{210}$ = −1.38834 × $10^{1}$ |
| $A_{111}$ = −2.95133 × $10^{-5}$ | $A_{211}$ = −7.82587 × $10^{-6}$ |
| $A_{112}$ = 8.69794 × $10^{-6}$ | $A_{212}$ = −1.57923 × $10^{-5}$ |
| $A_{113}$ = 2.95233 × $10^{-6}$ | $A_{213}$ = 1.42234 × $10^{-5}$ |
| $A_{114}$ = −1.16804 × $10^{-6}$ | $A_{214}$ = 1.07694 × $10^{-6}$ |
| $A_{115}$ = 3.02181 × $10^{-7}$ | $A_{215}$ = 1.53902 × $10^{-7}$ |
| $A_{116}$ = −8.25661 × $10^{-8}$ | $A_{216}$ = −7.23157 × $10^{-7}$ |
| $\frac{(N-1)F^3}{N^2 R_1^3} = 0.713$ | $\frac{(N-1)D}{NR_1} = 0.322$ |
| $\frac{R_1}{R_2} = -0.288$ | $\frac{R_2}{F} = -2.39$ |
| $\Delta_1(10) = 0.02529$ | $\Delta_2(10) = -0.00266$ |
| $\Delta_1(9) = 0.01542$ | $\Delta_2(9) = -0.00069$ |
| $\Delta_1(7) = 0.00529$ | $\Delta_2(7) = 0.00016$ |
| $\Delta_1(5) = 0.00134$ | $\Delta_2(5) = 0.00003$ |

Embodiment 12

| | |
|---|---|
| F = 1.0 | NA = 0.50 $\quad$ $\beta = 0$ |
| $R_1$ = 0.68768 | D = 0.70969 $\quad$ N = 1.57532 |
| $R_2$ = −2.19420 | W · D = 0.56434 |
| | t = 0.08871 $\quad$ Nt = 1.510 |
| $K_1$ = 1.67757 × $10^{-4}$ | $K_2$ = −6.08502 × $10^1$ |
| $A_{13}$ = −3.46061 × $10^{-2}$ | $A_{23}$ = −7.56380 × $10^{-2}$ |
| $A_{14}$ = −8.47761 × $10^{-2}$ | $A_{24}$ = 3.11476 × $10^{-2}$ |
| $A_{15}$ = −5.99075 × $10^{-3}$ | $A_{25}$ = −7.95033 × $10^{-1}$ |
| $A_{16}$ = −1.81711 × $10^{0}$ | $A_{26}$ = 2.51097 × $10^{0}$ |
| $A_{17}$ = 6.61295 × $10^{-1}$ | $A_{27}$ = −3.79304 × $10^{0}$ |
| $A_{18}$ = 1.73882 × $10^{0}$ | $A_{28}$ = 3.02655 × $10^{0}$ |
| $A_{19}$ = 1.69163 × $10^{1}$ | $A_{29}$ = −4.40557 × $10^{0}$ |
| $A_{110}$ = −1.92578 × $10^{1}$ | $A_{210}$ = −1.83521 × $10^{1}$ |
| $A_{111}$ = −3.33521 × $10^{-5}$ | $A_{211}$ = −6.28316 × $10^{-6}$ |
| $A_{112}$ = 8.74426 × $10^{-6}$ | $A_{212}$ = −1.58249 × $10^{-5}$ |
| $A_{113}$ = 2.91032 × $10^{-6}$ | $A_{213}$ = 1.41389 × $10^{-5}$ |
| $A_{114}$ = −1.57531 × $10^{-6}$ | $A_{214}$ = 1.29097 × $10^{-6}$ |
| $A_{115}$ = 4.11672 × $10^{-7}$ | $A_{215}$ = 1.13129 × $10^{-7}$ |
| $A_{116}$ = −6.52422 × $10^{-8}$ | $A_{216}$ = −6.94110 × $10^{-7}$ |
| $\frac{(N-1)F^3}{N^2 R_1^3} = 0.713$ | $\frac{(N-1)D}{NR_1} = 0.377$ |
| $\frac{R_1}{R_2} = -0.313$ | $\frac{R_2}{F} = -2.19$ |
| $\Delta_1(10) = 0.01200$ | $\Delta_2(10) = 0.00146$ |
| $\Delta_1(9) = 0.01019$ | $\Delta_2(9) = 0.00153$ |
| $\Delta_1(7) = 0.00451$ | $\Delta_2(7) = 0.00076$ |
| $\Delta_1(5) = 0.00121$ | $\Delta_2(5) = 0.00017$ |

Embodiment 13

| | |
|---|---|
| F = 1.0 | NA = 0.50 $\quad$ $\beta = 0$ |
| $R_1$ = 0.68768 | D = 0.77996 $\quad$ N = 1.57531 |
| $R_2$ = −2.06269 | W · D = 0.52702 |
| | t = 0.08871 $\quad$ Nt = 1.510 |
| $K_1$ = 1.82870 × $10^{-3}$ | $K_2$ = −6.00928 × $10^1$ |
| $A_{13}$ = −2.44392 × $10^{-2}$ | $A_{23}$ = −3.00087 × $10^{-2}$ |
| $A_{14}$ = −8.45372 × $10^{-2}$ | $A_{24}$ = −1.40769 × $10^{-1}$ |
| $A_{15}$ = −9.34272 × $10^{-2}$ | $A_{25}$ = −7.57093 × $10^{-1}$ |
| $A_{16}$ = −1.40660 × $10^{0}$ | $A_{26}$ = 3.97949 × $10^{0}$ |
| $A_{17}$ = 8.42223 × $10^{-1}$ | $A_{27}$ = −5.69922 × $10^{0}$ |
| $A_{18}$ = 1.18096 × $10^{0}$ | $A_{28}$ = 2.65503 × $10^{0}$ |
| $A_{19}$ = 4.36950 × $10^{0}$ | $A_{29}$ = −4.61243 × $10^{0}$ |
| $A_{110}$ = 1029290 × $10^{1}$ | $A_{210}$ = −1.87730 × $10^{1}$ |
| $A_{111}$ = −3.31097 × $10^{-5}$ | $A_{211}$ = −6.28316 × $10^{-6}$ |
| $A_{112}$ = 6.41128 × $10^{-6}$ | $A_{212}$ = −1.58258 × $10^{-5}$ |
| $A_{113}$ = 3.21519 × $10^{-6}$ | $A_{213}$ = 1.42401 × $10^{-5}$ |
| $A_{114}$ = −1.78442 × $10^{-6}$ | $A_{214}$ = 1.32498 × $10^{-6}$ |
| $A_{115}$ = 4.08316 × $10^{-7}$ | $A_{215}$ = 1.38229 × $10^{-7}$ |
| $A_{116}$ = −4.64873 × $10^{-8}$ | $A_{216}$ = −6.94476 × $10^{-7}$ |
| $\frac{(N-1)F^3}{N^2 R_1^3} = 0.713$ | $\frac{(N-1)D}{NR_1} = 0.415$ |
| $\frac{R_1}{R_2} = -0.333$ | $\frac{R_2}{F} = -2.06$ |
| $\Delta_1(10) = 0.00079$ | $\Delta_2(10) = 0.00345$ |
| $\Delta_1(9) = 0.00621$ | $\Delta_2(9) = 0.00269$ |
| $\Delta_1(7) = 0.00387$ | $\Delta_2(7) = 0.00120$ |
| $\Delta_1(5) = 0.00105$ | $\Delta_2(5) = 0.00034$ |

The above Embodiments 11, 12 and 13 are designed with a focal length F of 4.5 mm, a NA of 0.50, and a thickness t of the parallelepiped plate that is 0.4 mm, thereby presenting the imaging capability close to diffraction limits within an angle of view of about 1°. Under the above conditions of NA and the angle of view, a good imaging capability can be obtained even for a thickness t of the parallelepiped plate varying on the order of ±0.1 mm. Thus, the range of t=0.3–0.5 mm can provide a good imaging capability. In other words, a good imaging capability is obtainable in a range of 0.065F<t<0.111F.

An aspherical single lens of the present invention conditioned on t/F≃0.4/4.5 and NA≃0.50, is seen in the above Embodiments 11, 12 and 13, and it is preferable to meet the following conditions (28) to (30) along with the above conditions (1) to (3).

$$0.70 < \frac{(N-1)F^3}{N^2 R_1^3} < 0.73 \qquad (28)$$

-continued $$0.31 < \frac{(N-1)D}{NR_1} < 0.43 \quad (29)$$

$$-0.35 < \frac{R_1}{R_2} < -0.27 \quad (30)$$

The conditions (28), (29) are aimed to satisfactorily correct both spherical aberration and coma in the tertiary region.

If the numerical limit range of the condition (28) is exceeded above or below, the spherical aberration of the first surface in particular would become too large to correct the aberration using the aspherical term $\psi_1$ of the first surface.

The condition (29) is aimed to correct the coma at the second surface in a well-balanced manner. If the numerical limit range of this condition is exceeded above or below, the aberration could not be corrected satisfactorily using the aspherical term $\psi_2$ of the second surface, resulting in a significant decrease of the off-axis imaging capability.

The condition (30) is primarily aimed to satisfy the sinusoidal condition. The present invention contemplates satisfactorily correcting not only on-axis aberration, but also off-axis aberration in a certain area, especially coma. However, deviation from the range of the condition (18) would depart from the isoplanar condition to a large degree, resulting in an unsatisfactory result.

If the upper limit of the condition (30) is exceeded above, the radius of curvature of the first surface would become so small that a large extent of negative spherical aberration occurs, making it difficult to correct the aberration, and the working distance W·D would be so reduced as to cause difficulties from a practical geometry standpoint.

Furthermore, an aspherical single lens of the present invention conditioned on t/F≈0.4/4.5 and NA≈0.50 can satisfactorily correct, in particular, the spherical aberration by meeting the following conditions (31) to (34) along with the above conditions (1) to (3) and (28) to (30).

$$0 < \Delta_1(10) < 0.03F \quad (31)$$

$$0.0033F < \Delta_1(7) < 0.006F \quad (32)$$

$$-0.005F < \Delta_2(10) < 0.005F \quad (33)$$

$$0 < \Delta_2(7) < 0.002F \quad (34)$$

The conditions (31) to (34) are used to determine the aspherical extent at 10- and 7-division of the effective diameter of the lens first and second surfaces. Meeting the conditions (31) to (34) enables more satisfactory correction of the spherical aberration, in particular.

Exceeding above the upper limits of the conditions (31), (32) would result in an excessive extent of the spherical aberration. On the other hand, exceeding below the lower limits of the conditions (31), (32) would result in a deficient extent of spherical aberration which will deteriorate the on-axis imaging capability.

The conditions (33), (34) are primarily related to correction of the off-axis aberration. Deviation from the range of upper and lower limits would increase the extent of coma produced, resulting in deterioration of the off-axis imaging capability.

It is preferable for different correction of the spherical aberration to meet the following conditions;

$$0 < \Delta_1(9) < 0.02F \quad (35)$$

$$0.0005F < \Delta_1(5) < 0.0015F \quad (36)$$

and for different correction of the coma to meet the following conditions;

$$-0.001F < \Delta_2(9) < 0.003F \quad (37)$$

$$0 < \Delta_2(5) < 0.0005F \quad (38)$$

along with the above conditions (1) to (3) and (28) to (30).

Here, the conditions (35) to (38) are used to determine the aspherical extent at 9- and 5-division of the effective diameter of the lens first and second surfaces.

It is further preferable for correction of the aberration to meet the following condition (39) along with the above conditions (1) to (3) and (28) to (30):

$$-2.5 < \frac{R_2}{F} < -1.9 \quad (39)$$

If the lower limit of the condition (39) is exceeded below, the astigmatism would become excessive. If the upper limit is exceeded above, the coma would remain, leading to the unsatisfactory result.

Hereinafter, yet other preferred embodiments of an aspherical single lens of the present invention will be described.

As shown in FIG. 1, let it to be assumed that F is the focal length of the lens, NA is the numerical aperture, $\beta$ is the paraxial transverse magnification, $R_1$ is the radius of paraxial curvature of the first aspherical surface, $R_2$ is the radius of paraxial curvature of the second aspherical surface, D is a thickness of the lens at the center thereof, W·D is a working distance, t is a thickness of the parallelepiped plate, Ni is an index of refraction of the lens for the particular wavelength $\lambda = 830$ nm, Nt is an index of refraction of the parallelepiped plate for the particular wavelength $\lambda = 830$ nm, and $\Delta\nu(j)$ ($\nu = 1, 2$) is a difference in the direction of the optical axis between the aspherical surface at j-division of the lens effective diameter determined by the NA (numerical aperture) in the $\nu$-th surface and the spherical surface has a radius of paraxial curvature that is R (where $\Delta\nu(j)$ is assumed to be positive in a direction in which the curvature of the aspherical surface decreases).

The configuration of the aspherical surface is represented by the following equation, assuming that a distance from any arbitrary point on the aspherical surface to a plane tangential to an apex of the aspherical surface is X, a distance from the arbitrary point to the optical axis is H, the radius of reference curvature of the $\nu$-th surface (i.e., the radius of curvature of the apex) is $R\nu$, a conical constant of the $\nu$-th surface is $K\nu$, and the aspherical coefficient of the $\nu$-the surface is $A\nu_i$ ($i = 3, 4, \ldots$):

$$X = \frac{H^2/R\nu}{1 + \sqrt{1 - (1 + K\nu)(H/R\nu)^2}} + A\nu_3 H^3 + A\nu_4 H^4 + \ldots$$
$$(\nu = 1, 2)$$

Figure 15:
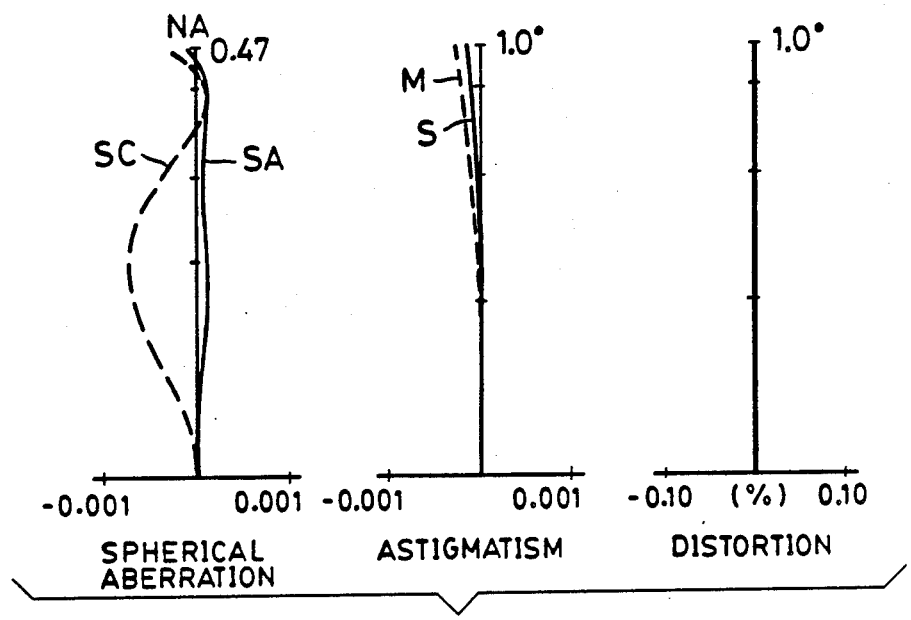
Figure 16:
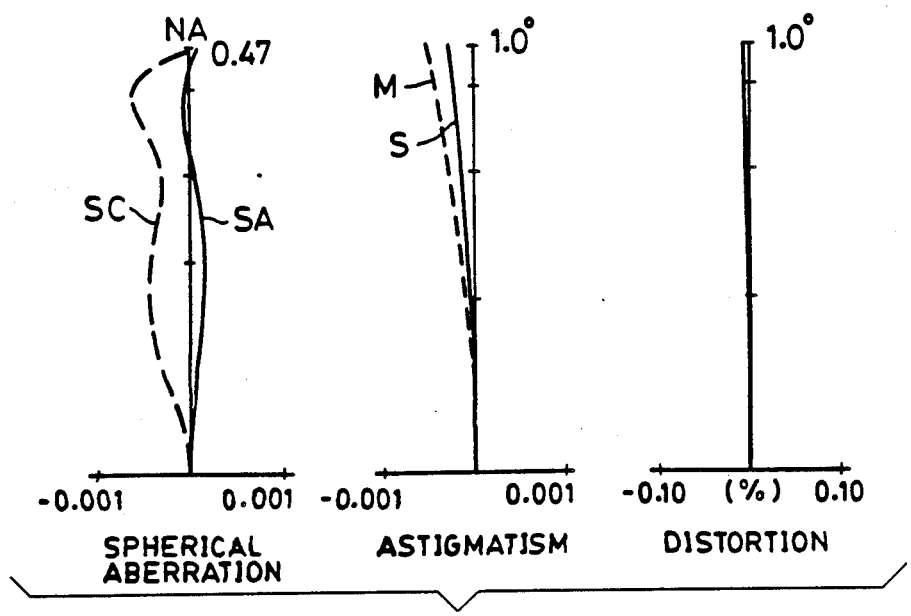

Further, FIGS. 15 and 16 are representations showing various types of aberration of the lens according to Embodiments 14 and 15 of the present invention, respectively. Shown in each representation are spherical aberration, astigmatism and distortion. SA designates the spherical aberration, SC designates the extent of unsatisfaction to the sinusoidal condition, M designates an image surface curve in the meridional plane, and S designates an image surface curve in the sagittal plane.

Embodiment 14

| | | |
|---|---|---|
| $F = 1.0$ | $NA = 0.42$ | $\beta = 0$ |
| $R_1 = 0.68755$ | $D = 0.66529$ | $N = 1.57532$ |
| $R_2 = 2.27906$ | $W \cdot D = 0.58786$ | |
| | $t = 0.08871$ | $Nt = 1.510$ |
| $K_1 = 6.28361 \times 10^{-2}$ | $K_2 = -7.00091 \times 10^{1}$ | |
| $A_{13} = -2.16317 \times 10^{-2}$ | $A_{23} = -3.35328 \times 10^{-3}$ | |
| $A_{14} = -4.24898 \times 10^{-2}$ | $A_{24} = -3.37362 \times 10^{-1}$ | |
| $A_{15} = -5.03660 \times 10^{-1}$ | $A_{25} = 1.75490 \times 10^{-1}$ | |
| $A_{16} = -1.36336 \times 10^{0}$ | $A_{26} = 3.64952 \times 10^{-1}$ | |
| $A_{17} = 1.54304 \times 10^{0}$ | $A_{27} = -3.01265 \times 10^{0}$ | |
| $A_{18} = 3.63946 \times 10^{0}$ | $A_{28} = 2.47448 \times 10^{0}$ | |
| $A_{19} = 4.33953 \times 10^{0}$ | $A_{29} = -2.85179 \times 10^{1}$ | |
| $A_{110} = -1.63823 \times 10^{0}$ | $A_{210} = 1.59293 \times 10^{1}$ | |
| $A_{111} = -3.89130 \times 10^{-5}$ | $A_{211} = 4.51401 \times 10^{-5}$ | |
| $A_{112} = 7.83997 \times 10^{-6}$ | $A_{212} = -8.89595 \times 10^{-6}$ | |
| $A_{113} = 3.70513 \times 10^{-6}$ | $A_{213} = 2.90965 \times 10^{-5}$ | |
| $A_{114} = -2.22663 \times 10^{-6}$ | $A_{214} = 5.13745 \times 10^{-6}$ | |
| $A_{115} = 5.06124 \times 10^{-7}$ | $A_{215} = 6.74467 \times 10^{-6}$ | |
| $A_{116} = 4.72031 \times 10^{-8}$ | $A_{216} = -1.11644 \times 10^{-5}$ | |
| $\frac{(N-1)F^3}{N^2 R_1^3} = 0.713$ | $\frac{(N-1)D}{NR_1} = 0.354$ | |
| $\frac{R_1}{R_2} = -0.302$ | $\frac{R_2}{F} = -2.28$ | |
| $\Delta_1(10) = 0.00724$ | $\Delta_2(10) = 0.00078$ | |
| $\Delta_1(9) = 0.00541$ | $\Delta_2(9) = 0.00086$ | |
| $\Delta_1(7) = 0.00208$ | $\Delta_2(7) = 0.00051$ | |
| $\Delta_1(5) = 0.00051$ | $\Delta_2(7) = 0.00017$ | |

Embodiment 15

| | | |
|---|---|---|
| $F = 1.0$ | $NA = 0.42$ | $\beta = 0$ |
| $R_1 = 0.68647$ | $D = 0.73183$ | $N = 1.57532$ |
| $R_2 = -2.16986$ | $W \cdot D = 0.55190$ | |
| | $t = 0.08871$ | $Nt = 1.510$ |
| $K_1 = 5.20593 \times 10^{-2}$ | $K_2 = -6.79105 \times 10^{1}$ | |
| $A_{13} = -2.22406 \times 10^{-2}$ | $A_{23} = -1.13810 \times 10^{-2}$ | |
| $A_{14} = -6.84116 \times 10^{-2}$ | $A_{24} = -3.13410 \times 10^{-1}$ | |
| $A_{15} = -3.08303 \times 10^{-1}$ | $A_{25} = 7.17002 \times 10^{-2}$ | |
| $A_{16} = -1.35893 \times 10^{0}$ | $A_{26} = 4.28976 \times 10^{-1}$ | |
| $A_{17} = 7.34739 \times 10^{-1}$ | $A_{27} = -2.50630 \times 10^{0}$ | |
| $A_{18} = 3.24484 \times 10^{0}$ | $A_{28} = 4.67335 \times 10^{0}$ | |
| $A_{19} = 4.54175 \times 10^{0}$ | $A_{29} = -6.59390 \times 10^{0}$ | |
| $A_{110} = 5.93378 \times 10^{0}$ | $A_{210} = 1.46333 \times 10^{1}$ | |
| $A_{111} = -3.66118 \times 10^{-5}$ | $A_{211} = 4.77442 \times 10^{-6}$ | |
| $A_{112} = 7.82079 \times 10^{-6}$ | $A_{212} = -4.88410 \times 10^{-6}$ | |
| $A_{113} = 3.34636 \times 10^{-6}$ | $A_{213} = 2.44366 \times 10^{-5}$ | |
| $A_{114} = -2.20191 \times 10^{-6}$ | $A_{214} = -2.44219 \times 10^{-6}$ | |
| $A_{115} = 4.72685 \times 10^{-7}$ | $A_{215} = 5.84567 \times 10^{-6}$ | |
| $A_{116} = 1.55052 \times 10^{-8}$ | $A_{216} = -8.87000 \times 10^{-6}$ | |
| $\frac{(N-1)F^3}{N^2 R_1^3} = 0.717$ | $\frac{(N-1)D}{NR_1} = 0.389$ | |
| $\frac{R_1}{R_2} = -0.316$ | $\frac{R_2}{F} = -2.17$ | |
| $\Delta_1(10) = 0.00657$ | $\Delta_2(10) = 0.00152$ | |
| $\Delta_1(9) = 0.00512$ | $\Delta_2(9) = 0.00112$ | |
| $\Delta_1(7) = 0.00202$ | $\Delta_2(7) = 0.00051$ | |
| $\Delta_1(5) = 0.00051$ | $\Delta_2(5) = 0.00015$ | |

The above Embodiments 14 and 15 are designed with a focal length F of 4.5 mm, a NA of 0.47, and a thickness t of the parallelepiped plate of 0.4 mm, thereby presenting the imaging capability close to diffraction limits within an angle of view of about 1°. Under the above conditions of NA and the angle of view, a good imaging capability can be obtained even for a thickness t of the parallelepiped plate varying on the order of ±0.1 mm. Thus, the range of t=0.3-0.5 mm can provide a good imaging capability. In other words, the good imaging capability is obtainable in a range of 0.065F<t<0.111F.

An aspherical single lens of the present invention conditioned on t/F≈0.4/4.5 and NA≈0.47, is seen in the above Embodiments 14 and 15, and it is preferable to meet the following conditions (40) to (41) along with the above conditions (1) to (3).

$$0.27 < \frac{(N-1)D}{NR_1} < 0.31 \tag{40}$$

$$-0.30 < \frac{R_1}{R_2} < -0.26 \tag{41}$$

The condition (40) is aimed to satisfactorily correct both spherical aberration and coma in the tertiary region.

The condition (40) is aimed to correct the coma at the second surface in a well-balanced manner. If the numerical limit range of this condition is exceeded above or below, the aberration could not be corrected satisfactorily using the aspherical term $\psi_2$ of the second surface, resulting in a significant decrease of the off-axis imaging capability.

The condition (41) is primarily aimed to satisfy the sinusoidal condition. The present invention contemplates satisfactorily correcting not only on-axis aberration, but also off-axis aberration in a certain area, especially coma. However, deviation from the range of the condition (41) would depart from the isoplanar condition to a large degree, resulting in an unsatisfactory result. If the upper limit of the condition (41) is exceeded above, the radius of curvature of the first surface would become so small that a large extent of negative spherical aberration occurs, making it difficult to correct the aberration, and the working distance W·D would be so reduced as to cause difficulties from the practical standpoint.

Furthermore, an aspherical single lens of the present invention conditioned on t/F≈0.4/4.5 and NA≈0.47 can satisfactorily correct, in particular, the spherical aberration by meeting the following conditions (42) to (45) along with the above conditions (1) to (3) and (40) to (41).

$$0.02F < \Delta_1(10) < 0.03F \tag{42}$$

$$0.004F < \Delta_1(7) < 0.005F \tag{43}$$

$$-0.003F < \Delta_2(10) < -0.002F \tag{44}$$

$$-0.0003F < \Delta_2(7) < -0.0001F \tag{45}$$

The conditions (42) to (45) are used to determine the aspherical extent at 10- and 7-division of the effective diameter of the lens first and second surfaces. Meeting the conditions (42) to (45) enables more satisfactory correction of the spherical aberration, in particular.

Exceeding above the upper limits of the conditions (42), (43) would result in an excessive extent of the spherical aberration. Conversely, exceeding below the lower limits of the conditions (42), (43) would result in a deficient extent of spherical aberration which will deteriorate the on-axis imaging capability.

The conditions (44), (45) are primarily related to correction of the off-axis aberration. Deviation from the range of upper and lower limits would increase the extent of coma produced, resulting in deterioration of the off-axis imaging capability.

It is preferable for different correction of the spherical aberration to meet the following conditions;

$$0.01F < \Delta_1(9) < 0.02F \quad (46)$$

$$0.001F < \Delta_1(5) < 0.0012F \quad (47)$$

and for different correction of the coma to meet the following conditions;

$$-0.0015F < \Delta_2(9) < -0.001F \quad (48)$$

$$-0.0001F < \Delta_2(5) < 0.0001F \quad (49)$$

along with the above conditions (1) to (3) and (40) to (41).

Here, the conditions (46) to (49) are used to determine the aspherical extent at 9- and 5-division of the effective diameter of the lens first and second surfaces.

It is further preferable for correction of the aberration to meet the following condition (50) along with the above conditions (1) to (3) and (40) to (41):

$$-2.6 < \frac{R_2}{F} < -2.3 \quad (50)$$

If the lower limit of the condition (50) is exceeded below, the astigmatism would become excessive. On the other hand, if the upper limit is exceeded above, the coma would remain, leading to an unsatisfactory result.

Figure 17:
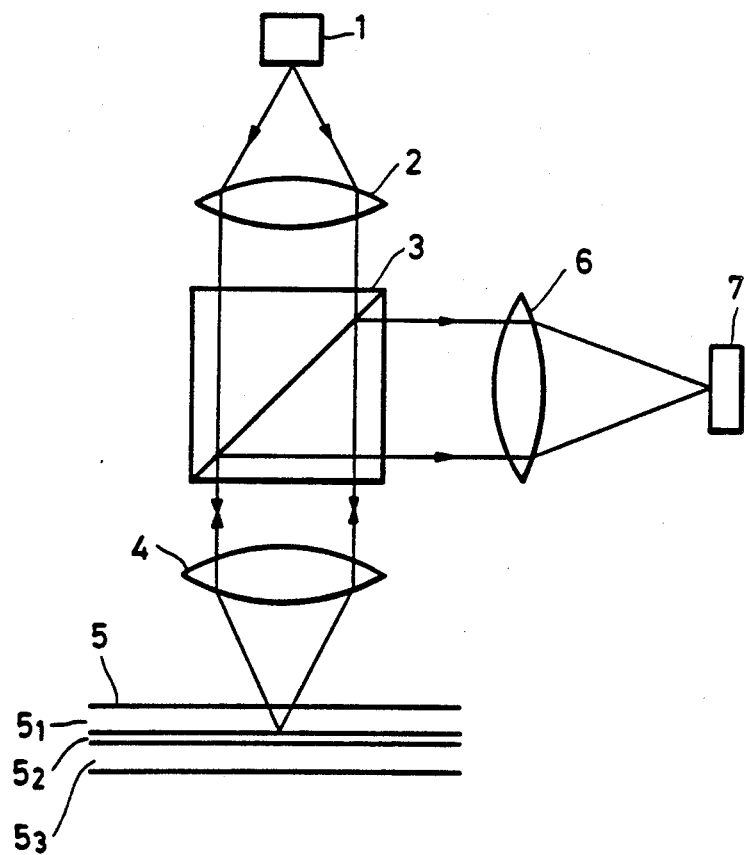
FIG. 17 is a schematic view showing an embodiment in which the aspherical single lens according to the present invention is applied to a recording reproducer for optical cards.

FIG. 17 is a schematic view showing an embodiment in which the aspherical single lens of the present invention is applied to a recording reproducer for optical cards. In FIG. 17, the numeral 1 is a semiconductor laser as a light source, 2 is a collimating lens, 3 is a beam splitter, 4 is an objective utilizing the aspherical single lens of the present invention, 5 is an optical card, $5_1$ is a transparent protective layer of the optical card 5, $5_2$ is an information recording medium layer of the optical card 5, $5_3$ is a support substrate of the optical card 5, 6 is a condensing lens, and 7 is a photodetector for detecting auto-focusing servo, auto-tracking servo and information signals.

A divergent light beam emitted from the semiconductor laser 1 is turned to a parallel beam by the collimating lens 2, and then passes through the beam splitter 3 for being in order to be imaged as a small spot on the information recording medium layer $5_2$ of the optical card 5, after passing through the objective 4. The light reflected from the information recording medium layer $5_2$ of the optical card 5 is turned to a parallel beam again by the objective 4. This parallel beam is reflected by the beam splitter 3 to enter the photodetector 7 through the condensing lens 6.

The objective 4 is movable by an actuator (not shown) in a direction of the optical axis thereof, and/or in a direction perpendicular to the optical axis, for carrying out both auto-focusing and auto-tracking servo control. The auto-focusing and auto-tracking servo control permits a small spot to be irradiated on the information recording medium layer so that recording and/or reproduction of information can be performed with high accuracy.

By utilizing the aspherical single lens of the present invention as the objective 4 in an optical head for the optical card recording reproducer as shown in FIG. 17, the optical head can be reduced in weight and size. A similar advantageous effect is obtained also in case of using the aspherical single lens of the present invention as the collimating lens 2.

As described above, the present invention can provide an aspherical single lens by which aberration in both on-axis and off-axis regions is satisfactorily corrected through a parallelepiped plate having a thickness of about 0.04 F– 0.111 F, i.e., 0.2 mm–0.5 mm.

Further, in an optical head of optical information recording reproducers such as optical card recording reproducers, it becomes possible to achieve an optical head of smaller weight and size by utilizing an aspherical single lens of the present invention as an objective or collimating lens.

While the present invention has been described with respect to what is presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. An aspherical single lens which has first and second surfaces both comprising aspherical surfaces represented by the following equation, and which meets the following conditions (1), (2) and (3), wherein a distance from any arbitrary point on either aspherical surface to a plane tangential to an apex of the aspherical surface is X, a distance from the arbitrary point to the optical axis is H, the radius of reference curvature of the $\nu$-th surface of said lens is $R\nu$, a conical constant of the $\nu$-th surface of said lens is $K\nu$, and the aspherical coefficient of the $\nu$-th surface is $A\nu_i$ (i=3, 4, ...):

$$X = \frac{H^2/R\nu}{1 + \sqrt{1 - (1 + K\nu)(H/R\nu)^2}} + A\nu_3 H^3 + A\nu_4 H^4 + \ldots$$
$$(\nu = 1, 2)$$

$$(1) \quad 0.68 < \frac{(N-1)F^3}{N^2 R_1^3} < 0.73$$

$$(2) \quad 0.27 < \frac{(N-1)D}{NR_1} < 0.51$$

$$(3) \quad -0.40 < \frac{R_1}{R_2} < -0.26$$

where F is the focal length of said aspherical single lens, D is a thickness of said aspherical single lens along the optical axis, $R_1$ is the radius of paraxial curvature of said first aspherical surface, $R_2$ is the radius of paraxial curvature of said second aspherical surface and N is an index of refraction of said aspherical single lens for a particular wavelength of light used with said lens.

2. An aspherical single lens according to claim 1, further meeting the following conditions (40) and (41):

$$0.27 < \frac{(N-1)D}{NR_1} < 0.31 \quad (40)$$

-continued $$-0.30 < \frac{R_1}{R_2} < -0.26 \quad (41)$$

3. An optical head comprising:
a light source; and
an optical system for introducing a light beam emitted from said light source to an information recording medium;
wherein said optical system consists of an aspherical single lens, said aspherical single lens having first and second surfaces both comprising aspherical surfaces represented by the following equation, and meeting the following conditions (1), (2) and (3), wherein a distance from any arbitrary point on either aspherical surface to a plane tangential to an apex of the aspherical surface is X, a distance from the arbitrary point to the optical axis is H, the radius of reference curvature of the $\nu$-th surface of said lens (i.e., the radius of curvature of the apex) is $R\nu$, a conical constant of the $\nu$-th surface is $K\nu$, and the aspherical coefficient of the $\nu$-th surface is $A\nu_i$ (i=3, 4, ...):

$$X = \frac{H^2/R\nu}{1 + \sqrt{1 - (1 + K\nu)(H/R\nu)^2}} + A\nu_3 H^3 + A\nu_4 H^4 + \ldots$$
$$(\nu = 1, 2)$$

(1) $\quad 0.68 < \frac{(N-1)F^3}{N^2 R_1^3} < 0.73$ (2) $\quad 0.27 < \frac{(N-1)D}{NR_1} < 0.51$ (3) $\quad -0.40 < \frac{R_1}{R_2} < -0.26$ where F is the focal length of the aspherical single lens, D is a thickness of the aspherical single lens along the optical axis, and N is an index of refraction of the aspherical single lens for the particular wavelength of light used within said light source.

* * * * *

UNITED STATES PATENT AND TRADEMARK OFFICE
CERTIFICATE OF CORRECTION

PATENT NO. : 4,932,763           Page 1 of 2
DATED : June 12, 1990
INVENTOR(S) : Kazuhiko MATSUOKA It is certified that error appears in the above-indentified patent and that said Letters Patent is hereby corrected as shown below:

COLUMN 1:

Line 42, "58-24021" should read --58-42021--.
Line 45, "compris" should read --comprises--.

COLUMN 2:

Line 7, "state" should read --stated--.
Line 9, "adapted" should read --adaptable--.
Line 32, "preferably" should read --preferable--.

COLUMN 8:

Line 32, "oif" should read --of--.
Line 68, "depert" should read --depart--.

COLUMN 9:

Line 10, "t/f~ 1.4/4.5" should read
--t/F~ 0.4/4.5--.
Line 29, "extend" should read --extent--.
Line 46, "comad" should read --coma--.
Line 57, "preferably" should read --preferable--.

COLUMN 10:

Line 27, "oif" should read --of--.
Line 44, "themeridional" should read --the meridional--.
Line 54, "$A_{13} = 2.14320 \times 10^{-2}$" should read
--$A_{13} = -2.14320 \times 10^{-2}$--.

UNITED STATES PATENT AND TRADEMARK OFFICE
CERTIFICATE OF CORRECTION

PATENT NO. : 4,932,763
DATED : June 12, 1990
INVENTOR(S) : Kazuhiko MATSUOKA

It is certified that error appears in the above-indentified patent and that said Letters Patent is hereby corrected as shown below:

<u>COLUMN 12</u>:

Line 40, "$R_2 = 1.78956$" should read --$R_2 = -1.78956$--.

Signed and Sealed this

Eighteenth Day of February, 1997

Attest:

BRUCE LEHMAN

*Attesting Officer*  *Commissioner of Patents and Trademarks*